(12) United States Patent
Tyagi et al.

(10) Patent No.: US 12,354,609 B2
(45) Date of Patent: Jul. 8, 2025

(54) METHOD AND ELECTRONIC DEVICE FOR ENHANCED INTERACTION WITH VOICE ASSISTANT USING USER ACCESSORIES DATA

(71) Applicant: SAMSUNG ELECTRONICS CO., LTD., Suwon-si (KR)

(72) Inventors: Mayank Kumar Tyagi, Bengaluru Karnataka (IN); Praveen Kumar Guvvakallu Sivamoorthy, Bengaluru Karnataka (IN); Navin N, Bengaluru Karnataka (IN); Vrajesh Navinchandra Sejpal, Bengaluru Karnataka (IN); Aravindh N, Bengaluru Karnataka (IN); Sudip Roy, Bengaluru Karnataka (IN); Sanofer H, Bengaluru Karnataka (IN); Arjun Janardhanan Kappatan, Bengaluru Karnataka (IN); Lalith Satya Vara Prasad Medeti, Bengaluru Karnataka (IN); Saumitri Choudhury, Bengaluru Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 17/981,399

(22) Filed: Nov. 5, 2022

(65) Prior Publication Data

US 2023/0245662 A1 Aug. 3, 2023

Related U.S. Application Data

(63) Continuation of application No. PCT/KR2022/014262, filed on Sep. 23, 2022.

(30) Foreign Application Priority Data

Jan. 28, 2022 (IN) .............................. 202241004863

(51) Int. Cl.
*G10L 17/22* (2013.01)
*G06F 3/0346* (2013.01)
(Continued)

(52) U.S. Cl.
CPC ............ *G10L 17/22* (2013.01); *G06F 3/0346* (2013.01); *G06T 11/00* (2013.01); *G10L 17/06* (2013.01)

(58) Field of Classification Search
CPC ... G10L 15/22; G10L 2015/223; G10L 15/30; G10L 17/22; G10L 15/26; G10L 15/16;
(Continued)

(56) References Cited

U.S. PATENT DOCUMENTS 9,811,535 B1 11/2017 Johnson et al.
10,812,422 B2 10/2020 Mullins
(Continued)

FOREIGN PATENT DOCUMENTS

CN 107317825 3/2021
KR 10-2017-0049053 5/2017

OTHER PUBLICATIONS

Search Report and Written Opinion dated Jan. 12, 2023 issued in International Patent Application No. PCT/KR2022/014262.
(Continued)

*Primary Examiner* — Abdelali Serrou
(74) *Attorney, Agent, or Firm* — Nixon & Vanderhye, P.C.

(57) ABSTRACT

Embodiments herein disclose a method for an enhanced interaction with a voice assistant using user accessories data by a first electronic device. The method includes detecting an utterance from a first user, where the utterance comprises a data item indicative of an identity of at least one second user. Further, the method includes determining at least one of position information and direction information of at least
(Continued)

one wearable electronic device connected to the first electronic device of the first user. Further, the method includes determining the identity of the at least one second user indicated in the utterance of the first user based on at least one of the position and the direction of the at least one wearable electronic device connected to the first electronic device.

11 Claims, 28 Drawing Sheets

(51) Int. Cl.
  *G06T 11/00* (2006.01)
  *G10L 17/06* (2013.01)
(58) Field of Classification Search
  CPC . G10L 15/187; G10L 2015/226; G10L 15/20; G10L 2015/228; G10L 15/04; G10L 2015/225; G10L 15/18; G10L 15/1822; G10L 15/28; G10L 17/06; G10L 17/24; G10L 2015/221; G10L 13/027; G10L 15/14; G10L 15/1815; G10L 15/32; G10L 21/02; G10L 25/48; G06F 3/167; G06F 21/32; G06F 1/163; G06F 3/165; G06F 3/16; G06F 3/012; G06F 9/4843; G06F 9/542; G06F 9/526; G06F 1/1616; G06F 1/1652; G06F 1/1684; G06F 1/1688; G06F 11/32; G06F 21/44; G06F 2203/04102; G06F 2203/04105; G06F 2203/04806; G06F 3/011; G06F 3/016; G06F 3/017; G06F 3/0346; G06F 3/0412; G06F 3/04817; G06F 3/0482; G06F 3/04845; G06F 3/0485; G06F 3/0488; G06F 40/35; G06F 16/3329; G06F 16/90332; G06F 3/1454; G06F 3/147; G06F 40/30
  See application file for complete search history.

(56) References Cited

U.S. PATENT DOCUMENTS

| | | | |
|---|---|---|---|
| 11,031,004 B2* | 6/2021 | Tokuchi | G10L 15/22 |
| 2012/0278078 A1 | 11/2012 | Ricci et al. | |
| 2012/0284646 A1 | 11/2012 | Sitrick et al. | |
| 2016/0118046 A1 | 4/2016 | Heck et al. | |
| 2017/0192401 A1 | 7/2017 | Wexler et al. | |
| 2017/0249552 A1* | 8/2017 | Boss | G06N 20/00 |
| 2018/0307303 A1* | 10/2018 | Powderly | G06F 3/017 |
| 2018/0366118 A1* | 12/2018 | Lovitt | G10L 15/063 |
| 2019/0259389 A1* | 8/2019 | Tokuchi | G10L 15/22 |
| 2019/0362725 A1 | 11/2019 | Himmelstein | |

OTHER PUBLICATIONS

Kuo: Apple's Mixed Reality Headset to Feature Eye Tracking System, Iris Recognition a Possibility, Mar. 18, 2021, [https://www.macrumors.com/2021/03/18/apple-mixed-reality-headset-eye-tracking/], 7 pages.
Examination Report dated Oct. 4, 2024 in Indian Patent Application No. 202241004863 and English-language translation.
Extended Search Report dated Oct. 8, 2024 in European Patent Application No. 22924314.2.
Hearing Notice dated Feb. 19, 2025 in Indian Patent Application No. 202241004863 and English-language translation.

* cited by examiner

S1100

S1300

S1400

S1500

FIG. 16
User A is wearing both Smart watch and ear buds
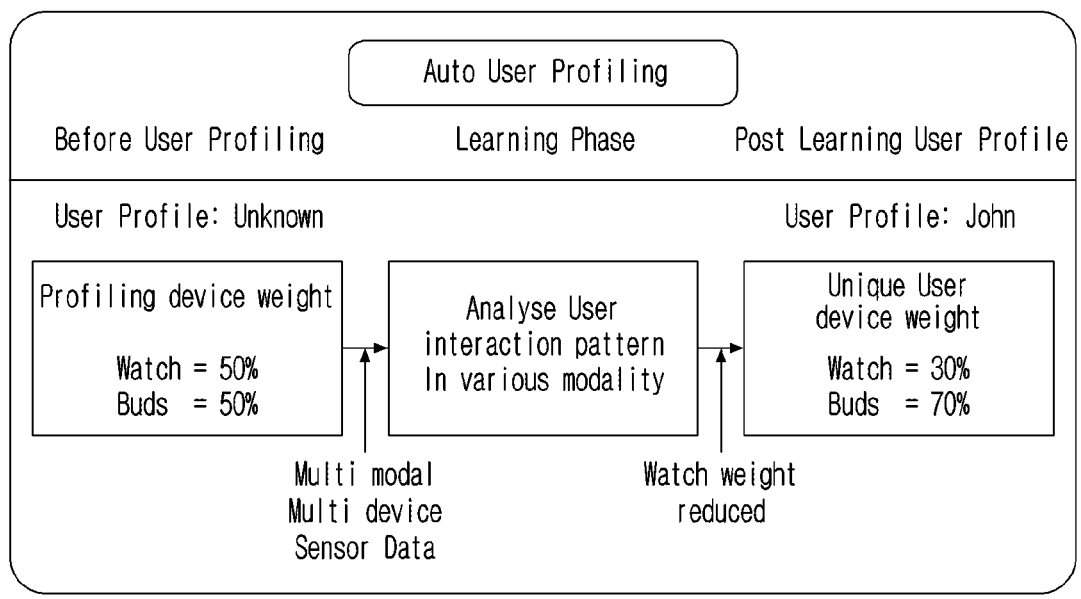

FIG. 17
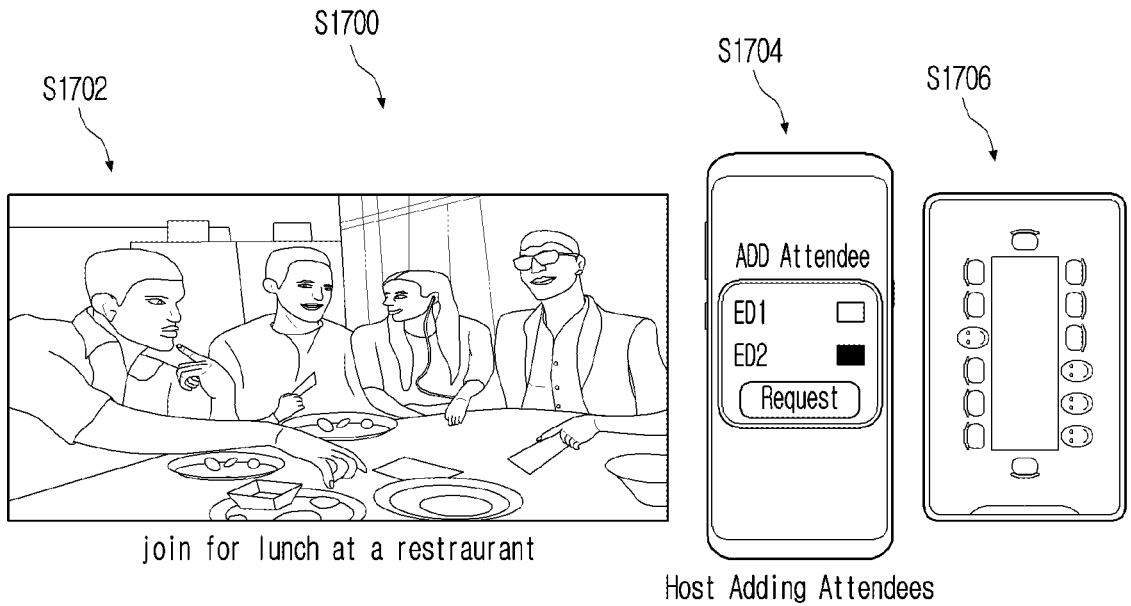
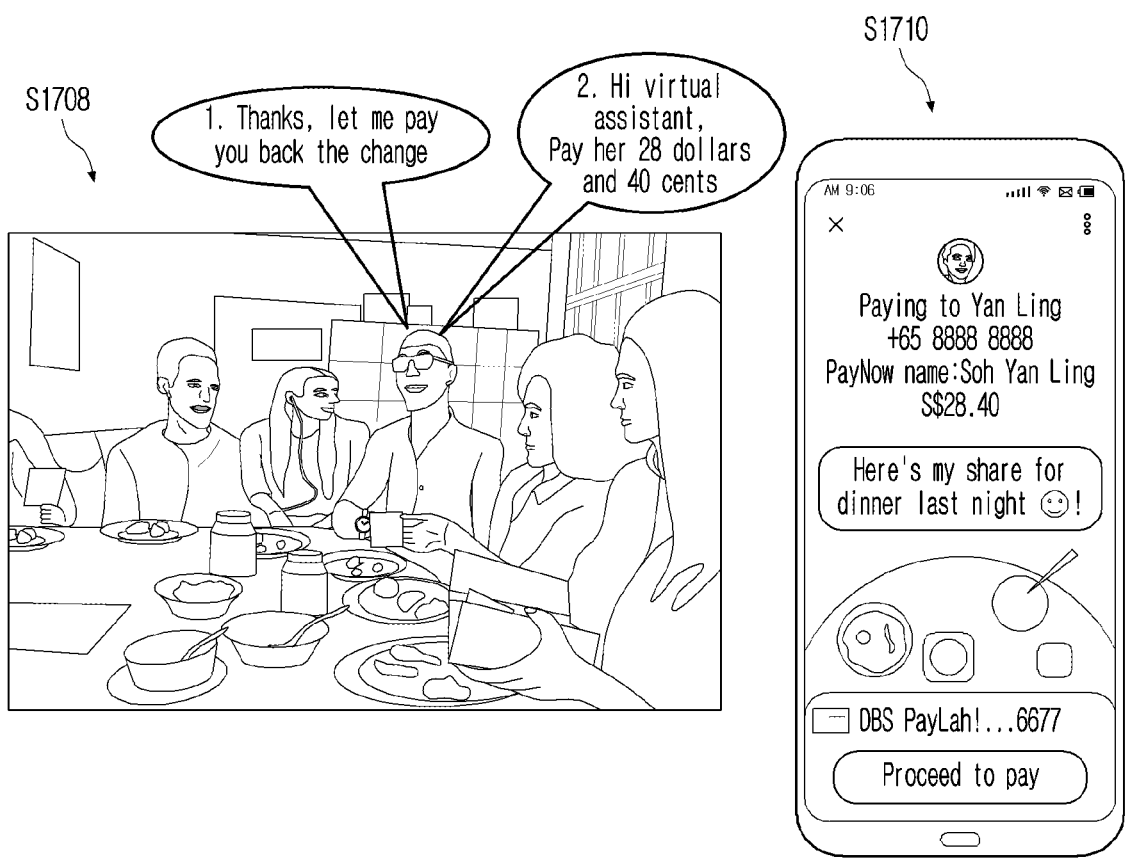

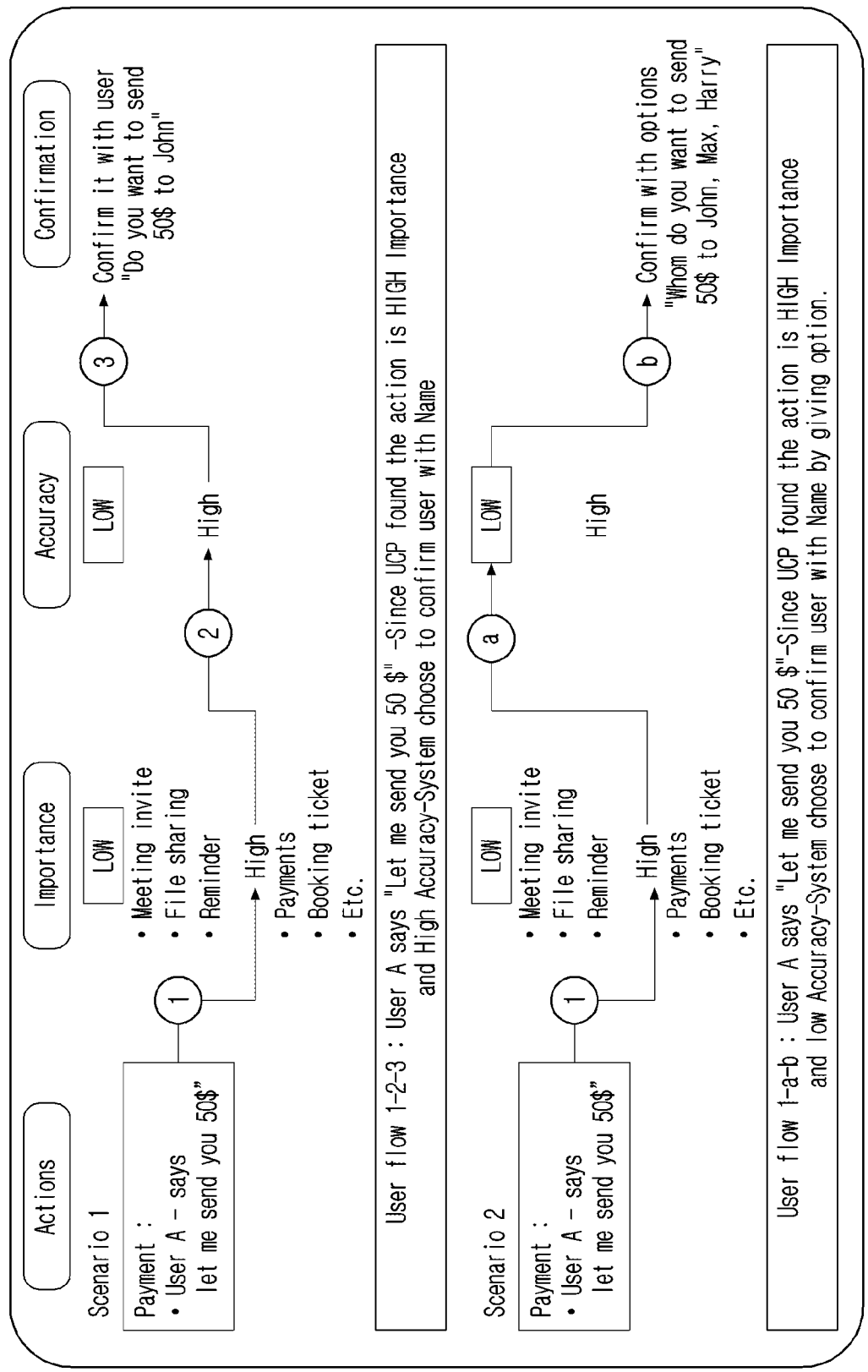

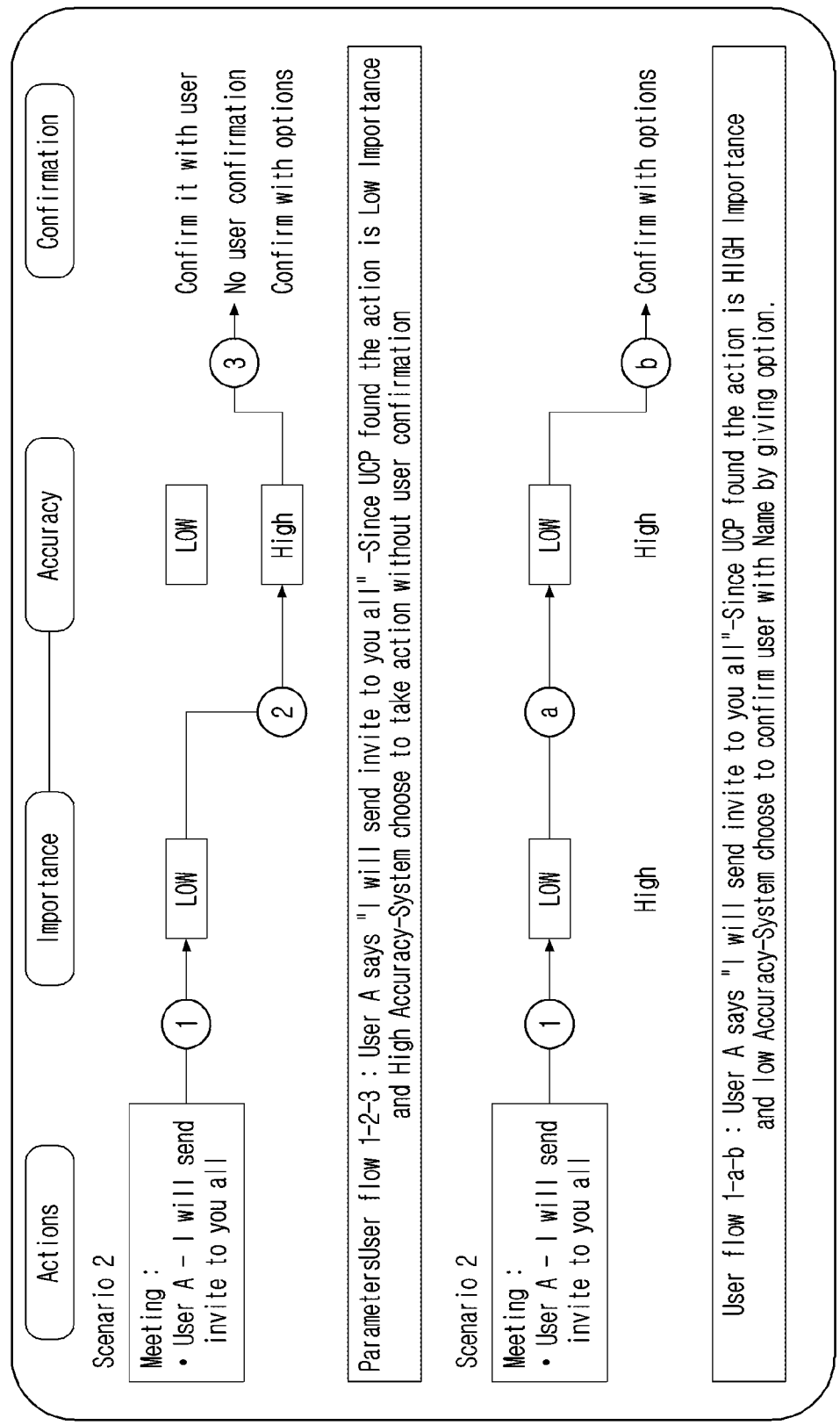

METHOD AND ELECTRONIC DEVICE FOR ENHANCED INTERACTION WITH VOICE ASSISTANT USING USER ACCESSORIES DATA

CROSS REFERENCE TO RELATED APPLICATIONS

This application is a continuation of International Application No. PCT/KR2022/014262 designating the United States, filed on Sep. 23, 2022, in the Korean Intellectual Property Receiving Office and claiming priority to Indian Application No. 202241004863, filed on Jan. 28, 2022, in the Indian Patent Office, the disclosures of which are incorporated by reference herein in their entireties.

BACKGROUND

Field

The disclosure relates to a virtual assistance system, and for example, to a method and an electronic device for enhanced interaction with a voice assistant using user accessories data.

Description of Related Art

An electronic device (e.g., smartphone or the like) and various connected wearable devices and accessories are getting popular in the market. Further, a voice assistance is making users' life easier by providing frictionless operations and ease of access, but it has its own drawbacks (e.g., virtual assistance does not fully understand a context of a user conversation and perform an action based on the context of the user conversation).

FIG. 1 is an example illustration (S100) in which a voice assistant is not able to book a cab unless a user name is specifically mentioned, according to prior art. In an example, as shown in FIG. 1, three friends (e.g., User A, User B, and User C) having the conversation and the user B want his friends (e.g., User A) to book a cab for him. The user A of the electronic device (100) asked the virtual assistance to book a cab for the User B, but the virtual assistance booked the cab for the User A as the virtual assistance couldn't understand for whom user asked to book the cab. This results in reducing the user experience.

FIG. 2 is an example illustration (S200) in which a voice assistant is not make a payment unless recipient's name is explicitly mentioned, according to prior art. In another example, as shown in FIG. 2, four friends having the conversation and the user A of the electronic device wants to pay for the user B. The user A asked the virtual assistance running in the electronic device (100) to pay the user B. But, the virtual assistance couldn't understand whom should it pay. This results in reducing the user experience.

In another example, the user of the electronic device (100) instructs the voice assistance as "let's discuss Q2 results with both of you at 4 P.M. tomorrow" But, the virtual assistance couldn't understand the conversation and asked to the user as "please help me with the names of the attendees of the meeting".

In an example (S300), as shown in FIG. 3, according to prior art, the voice assistant is only able to make the payment even if recipient's name is not explicitly mentioned, using augmented reality (AR) glasses which are always on camera devices, unlike mobile phones/smart phones. In another example, the user of the electronic device (100) which is smart glasses, instructs the voice assistance as "pay him 100 Dollars". And, since the camera was able to detect the person in front, the virtual assistance completed the action.

Thus, it is desired to address the above mentioned disadvantages or other shortcomings or at least provide a useful alternative.

SUMMARY

Embodiments of the disclosure provide a method and an electronic device for enhanced interaction with a voice assistant using user accessories data Embodiments of the disclosure create a collaborative voice interaction session and generate a virtual map indicative of relative locations of one or more second electronic device in relation to a first electronic device.

Embodiments of the disclosure dynamically update the virtual map by correlating inertial measurement units (IMU) sensor data received from one or more wearable device connected with the first electronic device and corresponding to monitored conversations, so as to enhance the user experience.

Embodiments of the disclosure dynamically update the virtual map by intelligently infer from only user's accessories' IMU sensor data and the user conversation.

Embodiments of the disclosure execute one or more voice command involving the first electronic device and at least one second electronic device by correlating the IMU sensor data received from one or more wearable devices of a user, associated with the first electronic device, corresponding to monitored conversations with other users with respect to the virtual map.

Embodiments of the disclosure provide an enhanced interaction with a voice assistant by creating a collaborative voice interaction session with one or more nearby electronic devices and monitoring conversations between the users.

Embodiments of the disclosure perform a person identification and update the generated virtual map to enable natural voice interactions on the one or more electronic devices.

Embodiments of the disclosure enhance the interaction with voice assistants using sensor data from user accessories in correlation to the monitored conversations between multiple users.

Accordingly, example embodiments herein disclose a method for an enhanced interaction with a voice assistant using user accessories data. The method includes: detecting, by a first electronic device, at least a first user associated with the first electronic device and at least one second user in a specified proximity of the first user during a voice interaction between the first user and the at least one second user; detecting, by the first electronic device, an utterance from the first user, the utterance comprising a data item indicative of an identity of the at least one second user; determining, by the first electronic device, at least one of position information and direction information of at least one second electronic device connected to the first electronic device of the first user using a wearable device inertial measurement unit (IMU) sensor data; determining, by the first electronic device, the identity of the at least one second user indicated in the utterance of the first user based on at least one of the position and the direction of the at least one second electronic device connected to the first electronic device.

In an example embodiment, the method includes: detecting, by the first electronic device, a presence of at least one second device in the specified proximity of the first electronic device; establishing, by the first electronic device, a collaborative voice interaction session with the at least one second device in response to a user input on the first electronic device; creating, by the first electronic device, a virtual map indicative of a relative location of the at least one second electronic device in relation to the first electronic device; based on the virtual map being created, placing the first user in the virtual map as an anchor or reference point; monitoring, by the first electronic device, conversations between the first user of the first electronic device and the at least one second user of the at least one second electronic device; receiving, by the first electronic device, IMU sensor data corresponding to the monitored conversations from the at least one wearable electronic device connected to the first electronic device of the first user, the IMU sensor data comprising the position information and the direction information of the movement of at least one wearable electronic device; generating, by the first electronic device, one or more executable voice commands involving at least one of the first electronic device, the wearable electronic device and the at least one second electronic device by correlating the IMU sensor data corresponding to monitored conversations with the virtual map.

In an example embodiment, the method includes: sending, by the first electronic device, the one or more executable voice commands to at least one of the first electronic device, the wearable electronic device and the at least one second electronic device; and automatically performing, by the first electronic device, at least one action based on the one or more executable voice commands in at least one of the first electronic device, the wearable electronic device and the at least one second electronic device.

In an example embodiment, creating, by the first electronic device, the virtual map indicative of the relative location of the at least one second electronic device in relation to the first electronic device includes: receiving, by the first electronic device, at least one signal from the at least one second electronic device, determining, by the first electronic device, an Angle of Arrival (AoA) and a Received Signal Strength (RSS) based on the at least one signal received from the at least one second electronic device, determining, by the first electronic device, the relative location of the at least one second electronic device in relation to the first electronic device based on the AoA and the RSS, and creating, by the first electronic device, the virtual map indicative of the relative location of the at least one second electronic device in relation to the first electronic device.

In an example embodiment, the method includes: determining, by the first electronic device, an importance level of conversation between the first user and the at least one second user based on the utterances; determining, by the first electronic device, an accuracy level of determining the identity of the at least one second user based on at least one of the position and the direction of the at least one wearable electronic device; determining, by the first electronic device, whether the importance level meets an importance threshold and the accuracy level meets an accuracy threshold; confirming the identity of the at least one second user by displaying the identity of the at least one second user to the first user in response to determining that at least one of the importance level does meets the importance threshold and the accuracy level does meets the accuracy threshold; and confirming the identity of the at least one second user by providing multiple options to the first user in response to determining that at least one of the importance level does not meets the importance threshold and the accuracy level does not meets the accuracy threshold.

In an example embodiment, determining, by the first electronic device, at least one of position information and direction information of the at least one wearable electronic device connected to the first electronic device of the first user includes: determining, by the first electronic device, a weight for each of the at least one wearable electronic device from a plurality of wearable electronic devices connected to the first electronic device of the first user by applying a machine learning model, and determining, by the first electronic device, at least one of position information and direction information of the at least one wearable electronic device based the weight of each of the at least one wearable electronic device.

Accordingly, example embodiments herein disclose a first electronic device for an enhanced interaction with a voice assistant using user accessories data. The first electronic device includes: a user identity controller communicatively connected to a memory and a processor. The user identity controller is configured to: detect at least a first user associated with the first electronic device and at least one second user in a specified proximity of the first user during a voice interaction between the first user and the at least one second user; detect an utterance from the first user, where the utterance comprises a data item indicative of an identity of the at least one second user; determine at least one of position information and direction information of at least one second electronic device connected to the first electronic device of the first user using a wearable device inertial measurement unit (IMU) sensor data; and determine the identity of the at least one second user indicated in the utterance of the first user based on at least one of the position and the direction of the at least one second electronic device connected to the first electronic device.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

Various example embodiments are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which:

FIG. 16 is a diagram illustrating an example in which an auto user profiling is explained, according to various embodiments;

FIG. 17 is a diagram illustrating an example in which the system provides the enhanced interaction with the voice assistant using the user accessories data is depicted when the user of the electronic device makes the payment in a restaurant, according to various embodiments;

FIG. 21 and FIG. 22 are diagrams illustrating an example in which the first electronic device identities a second user associated with one or more second electronic device and determines the importance and accuracy levels according to an embodiment as disclosed herein.

DETAILED DESCRIPTION

Figure 1:
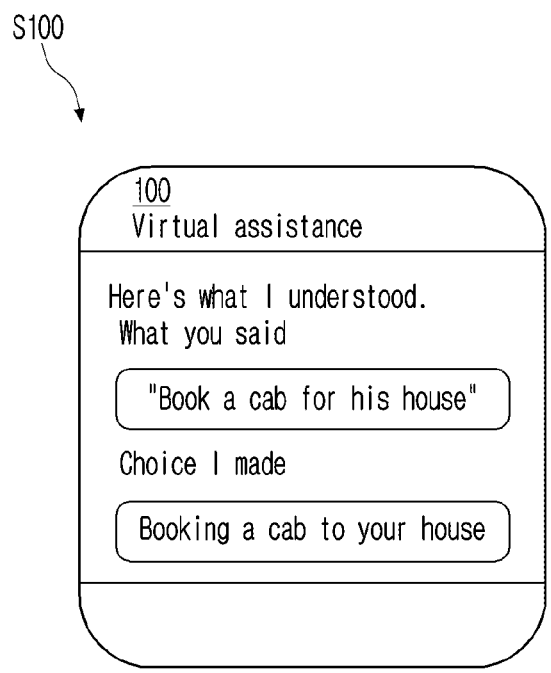
FIG. 1 is diagram illustrating an example in which a voice assistant is not able to book a cab unless a user name is specifically mentioned, according to the prior art.
Figure 2:
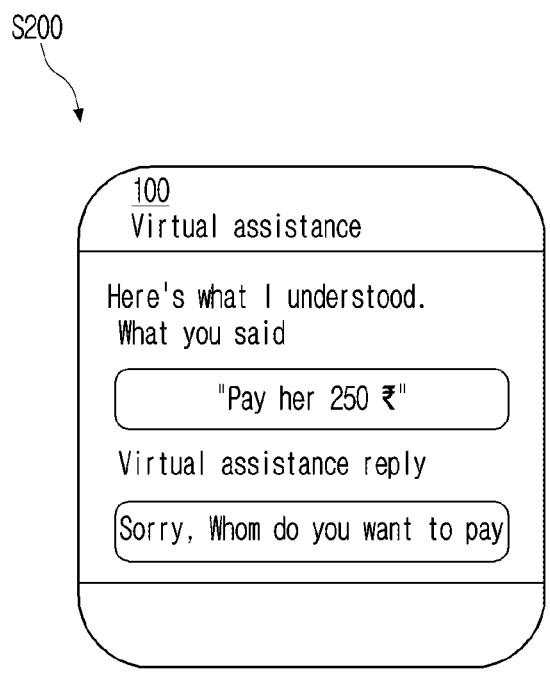
FIG. 2 is diagram illustrating an example in which the voice assistant is not make a payment unless recipient's name is explicitly mentioned, according to the prior art.
Figure 3:
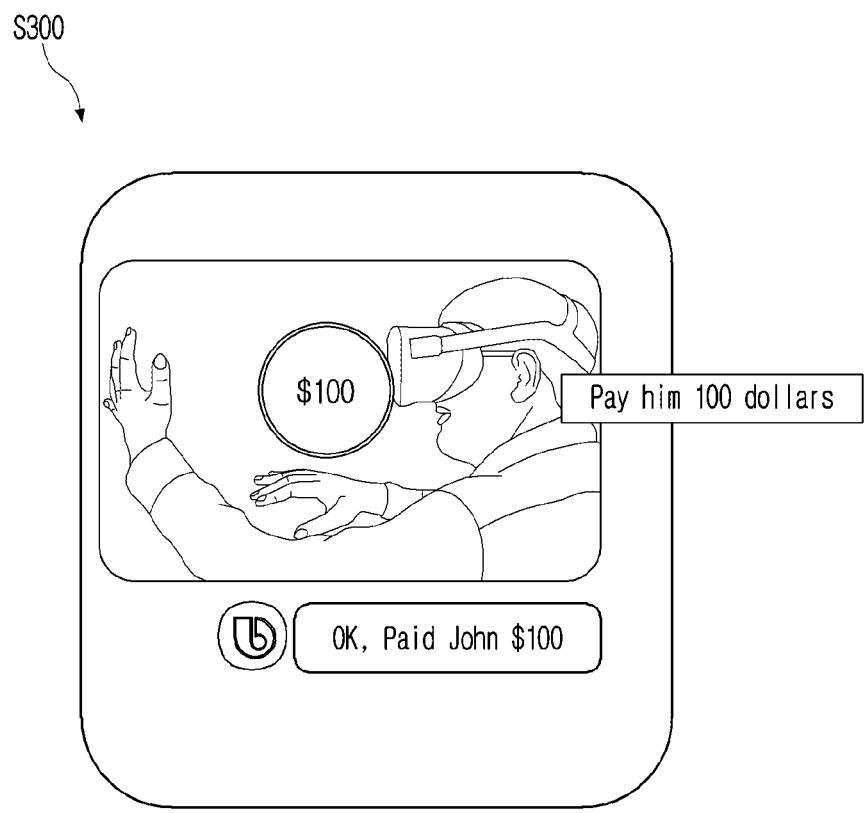
FIG. 3 is diagram illustrating an example in which the voice assistant makes a payment using AR glasses, according to the prior art.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the descriptions herein. Also, the various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for an enhanced interaction with a voice assistant using user accessories data. The method includes detecting, by a first electronic device, at least a first user associated with the first electronic device and at least one second user in the vicinity of the first user during a voice interaction between the first user and the at least one second user. Further, the method includes detecting, by the first electronic device, an utterance from the first user. The utterance comprises a data item indicative of an identity of the at least one second user. Further, the method includes determining, by the first electronic device, at least one of position information and direction information of at least one second electronic device connected to the first electronic device of the first user using a wearable devices IMU sensor data. Further, the method includes determining, by the first electronic device, the identity of the at least one second user indicated in the utterance of the first user based on at least one of the position and the direction of the at least one second electronic device connected to the first electronic device.

Unlike conventional methods and systems, the disclosed method can be used to create the collaborative voice interaction session and generate the virtual map indicative of relative locations of one or more second electronic device in relation to the first electronic device. The method can be used to dynamically update the virtual map by correlating IMU sensor data received from one or more wearable device connected with the first electronic device and corresponding to monitored conversations, so as to enhance the user experience.

The method can be used to dynamically update the virtual map by intelligently infer from only user's accessories' IMU sensor data and the user conversation. The method can be used to execute one or more voice command involving the first electronic device and at least one second electronic device by correlating the IMU sensor data received from one or more wearable devices of a user, associated with the first electronic device, corresponding to monitored conversations with other users with respect to the virtual map. The method can be used to provide an enhanced interaction with a voice assistant by creating a collaborative voice interaction session with one or more nearby electronic devices and monitoring conversations between the users. The method can be used to enhance the interaction with voice assistants using the sensor data from the user accessories in correlation to the monitored conversations between multiple users.

Referring now to the drawings, and more particularly to FIGS. 4 through 12C, and 15-23C, there are shown various example embodiments.

Figure 4:
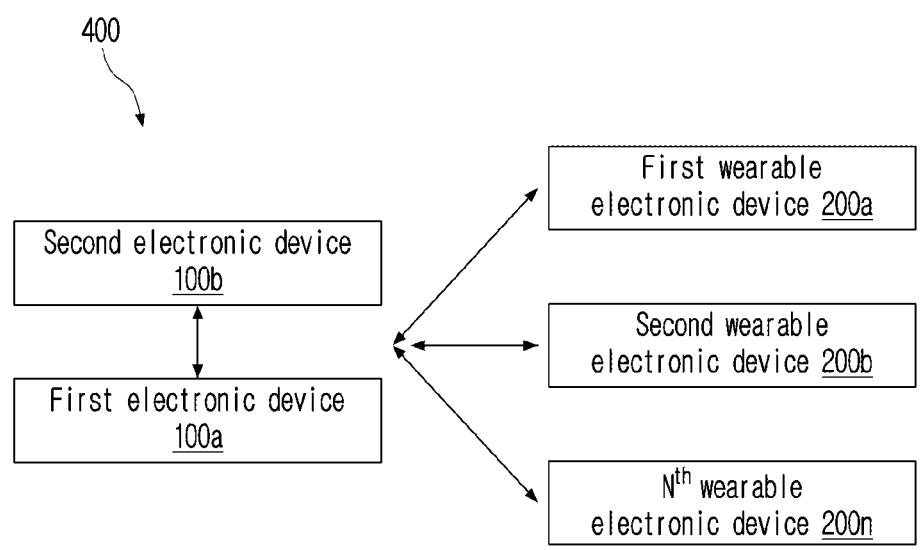
FIG. 4 diagram illustrating an example system for an enhanced interaction with a voice assistant using user accessories data, according to various embodiments.

FIG. 4 is a diagram illustrating an example configuration of a system (400) for an enhanced interaction with a voice assistant using user accessories data, according to various embodiments. In an embodiment, the system (400) includes a first electronic device (100*a*), one or more second electronic device (100*b*) and one or more wearable electronic device (200*a*, 200*b*, 200*n*). The first electronic device (100*a*) and the one or more second electronic device (100*b*) can be, for example, but not limited to a foldable device, a cellular phone, a smart phone, a Personal Digital Assistant (PDA), a tablet computer, a laptop computer, an immersive device, a virtual reality device, a videography system, a camera, and an Internet of Things (IoT) or the like. The one or more wearable electronic device (200) can be, for example, but not limited to a smart watch, a smart buds, a smart ring, a smart band, a smart hair or the like.

The first electronic device (100*a*) is configured to detect a first user associated with the first electronic device (100*a*) and one or more second user in the vicinity of the first user during a voice interaction between the first user and the one or more second user. Further, the first electronic device (100*a*) is configured to detect an utterance from the first user. The utterance includes a data item indicative of an identity of the one or more second user. After detecting the utterance from the first user, the first electronic device (100*a*) is configured to determine position information and direction information of one or more wearable electronic device (200) connected to the first electronic device (100*a*) of the first user.

The position information and the direction information of the wearable electronic device (200) connected to the first electronic device (100*a*) of the first user is determined by determining a weight for each of the wearable electronic device (200) from a plurality of wearable electronic devices (200*a*-200*n*) connected to the first electronic device (100*a*) of the first user by applying a machine learning model (using a machine learning model controller (160) (explained in greater detail below with reference to FIG. 5)), and determining the position information and direction information of the wearable electronic device (200) based the weight of each of the wearable electronic device (200). In an example, the user "A" has a habit of nodding or moving his head too often while talking and he is wearing both smart watch and a smart glass. During a conversation the first device receives the IMU data from both wearable devices (watch and glasses) so which one should it rely more? So in case of such User 'A', system/method will give higher weight to the watch IMU data based on hand gestures as due to nodding habit of the user, glasses' IMU data may give false positive results at times. Similarly, if user 'B' moves his hands too often, method may give higher weight to ear buds or smart glasses than smart watch.

Based on the position and the direction of the one or more wearable electronic device (200), the first electronic device (100*a*) is configured to determine the identity of the one or more second user indicated in the utterance of the first user.

Further, the first electronic device (100*a*) is configured to detect a presence of one or more second electronic device (100*b*) in the vicinity of the first electronic device (100*a*). Based on the user input on the first electronic device (100*a*), the first electronic device (100*a*) is configured to establish a collaborative voice interaction session with the one or more second electronic device. Further, the first electronic device (100*a*) is configured to create a virtual map indicative of a relative location of the one or more second electronic device (100*b*) in relation to the first electronic device (100*a*). When the virtual map is created, the first user is placed in the virtual map as an anchor or reference point.

The virtual map indicative of the relative location of the one or more second electronic device (100*b*) in relation to the first electronic device (100*a*) is created by receive a signal from the one or more second electronic device (100*b*), determine an AoA and a RSSI based on the signal received from the one or more second electronic device (100*b*), determine the relative location of the one or more second electronic device (100*b*) in relation to the first electronic device (100*a*) based on the AoA and the RSSI, and creating the virtual map indicative of the relative location of the one or more second electronic device (100*b*) in relation to the first electronic device (100*a*).

Further, the first electronic device (100*a*) is configured to monitor conversations between the first user of the first electronic device (100*a*) and the one or more second user of the one or more second electronic device (100*b*). Further, the first electronic device (100*a*) is configured to receive IMU sensor data corresponding to the monitored conversations from the one or more wearable electronic device (200) connected to the first electronic device (100*a*) of the first user. The IMU sensor data includes the position information and the direction information of the one or more wearable electronic device (200). Further, the first electronic device (100*a*) is configured to generate one or more executable voice commands involving of the first electronic device (100a), the wearable electronic device (200) and the one or more second electronic device (100b) by correlating the IMU sensor data corresponding to monitored conversations with the virtual map.

Further, the first electronic device (100a) is configured to send the one or more executable voice commands to the first electronic device (100a), the wearable electronic device (200) and the one or more second electronic device (100b-100n). Based on the one or more executable voice commands in the first electronic device (100a), the wearable electronic device (200) and the one or more second electronic device (100b), the first electronic device (100a), the wearable electronic device (200) and the one or more second electronic device (100b) automatically perform one or more action. The one or more action can be, for example, creating an event, a setting a reminder or the like.

Further, the first electronic device (100a) is configured to determine an importance level of conversation between the first user and the one or more second user based on the utterances. Further, the first electronic device (100a) is configured to determine an accuracy level of the conversation based on the position and the direction of the one or more wearable electronic device (200). In an embodiment, based on predefined policy, the user intent or the user action is classified into these categories such as High, Medium, low importance or if that the user intent or the user action needs to be of low medium or high level of accuracy. For example, the payment related user action or the user intent, need to be of high importance and need to be highly accurate, so that the system should definitely confirm from the user. Whereas setting a calendar event can be of low importance and if the secondary user determination accuracy is high, it can complete the action without seeking explicit confirmation from user while in case of disambiguation between two secondary users (e.g., if the accuracy is low) and may just consider getting using input to select one of the probable secondary user.

Further, the first electronic device (100a) is configured to determine whether the importance level meets an importance threshold and the accuracy level meets an accuracy threshold. Further, the first electronic device (100a) is configured to confirm the identity of the one or more second user by displaying the identity of the one or more second user to the first user. Alternately, the first electronic device (100a) is configured to confirm the identity of the second user by providing multiple options to the first user.

Figure 5:
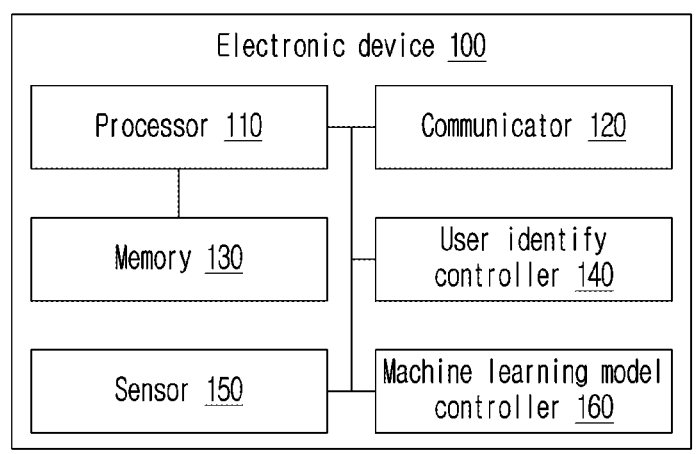
FIG. 5 is a block diagram illustrating an example configuration of a first electronic device for the enhanced interaction with a voice assistant using the user accessories data, according to various embodiments.

FIG. 5 is a block diagram illustrating an example configuration of the first electronic device (100a) for the enhanced interaction with the voice assistant using the user accessories data, according to various embodiments. The electronic device (100) includes a processor (e.g., including processing circuitry) (110), a communicator (e.g., including communication circuitry) (120), a memory (130), a user identity controller (e.g., including control/processing circuitry) (140), a sensor (150) and a machine learning model controller (e.g., including control/processing circuitry) (160). The processor (110) is provided with the communicator (120), the memory (130), the user identity controller (140), the sensor (150) and the machine learning model controller (160).

The user identity controller (140) is configured to detect the first user associated with the first electronic device (100a) and one or more second user in the vicinity of (e.g., within a specified proximity of) the first user during the voice interaction between the first user and the one or more second user. Further, the user identity controller (140) is configured to detect the utterance from the first user. After detecting the utterance from the first user, the user identity controller (140) is configured to determine the position information and the direction information of one or more wearable electronic device (200) connected to the first electronic device (100a) of the first user.

Based on the position and the direction of the one or more wearable electronic device (200), the user identity controller (140) is configured to determine the identity of the one or more second user indicated in the utterance of the first user. Further, the user identity controller (140) is configured to detect the presence of one or more second electronic device (100b) in the vicinity of the first electronic device (100a). Based on the user input on the first electronic device (100a), the user identity controller (140) is configured to establish the collaborative voice interaction session with the one or more second electronic device (100b). Further, the user identity controller (140) is configured to create the virtual map indicative of the relative location of the one or more second electronic device (100b) in relation to the first electronic device (100a).

In an embodiment, the user identity controller (140) is configured to receive the signal from the one or more second electronic device (100b) and determine the AoA and the RSSI based on the signal received from the one or more second electronic device (100b). Further, the user identity controller (140) is configured to determine the relative location of the one or more second electronic device (100b) in relation to the first electronic device (100a) based on the AoA and the RSSI and create the virtual map indicative of the relative location of the one or more second electronic device (100b) in relation to the first electronic device (100a).

Further, the user identity controller (140) is configured to monitor conversations between the first user of the first electronic device (100a) and the one or more second user of the one or more second electronic device (100b). Further, the user identity controller (140) is configured to receive IMU sensor data corresponding to the monitored conversations from the one or more wearable electronic device (200) connected to the first electronic device (100a) of the first user. The IMU sensor data includes the position information and the direction information of the one or more wearable electronic device (200). Further, the user identity controller (140) is configured to generate one or more executable voice commands involving of the first electronic device (100a), the wearable electronic device (200) and the one or more second electronic device (100b) by correlating the IMU sensor data corresponding to monitored conversations with the virtual map.

Further, the user identity controller (140) is configured to send the one or more executable voice commands to the first electronic device (100a), the wearable electronic device (200) and the one or more second electronic device (100b-100n). Based on the one or more executable voice commands in the first electronic device (100a), the wearable electronic device (200) and the one or more second electronic device (100b), the first electronic device (100a), the wearable electronic device (200) and the one or more second electronic device (100b) automatically perform one or more action.

Further, the user identity controller (140) is configured to determine an importance level of conversation between the first user and the one or more second user based on the utterances. Further, the user identity controller (140) is configured to determine an accuracy level of the conversation based on the position and the direction of the one or more wearable electronic device (200). Further, the user identity controller (140) is configured to determine whether the importance level meets an importance threshold and the accuracy level meets the accuracy threshold. Further, the user identity controller (140) is configured to confirm the identity of the one or more second user by displaying the identity of the one or more second user to the first user. The user identity controller (140) is configured to confirm the identity of the second user by providing multiple options to the first user.

The user identity controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) may include various processing circuitry and is configured to execute instructions stored in the memory (130) and to perform various processes. The communicator (120) may include various communication circuitry and is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model using the machine learning model controller (160). A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5 shows various hardware components of the first electronic device (100a) it is to be understood that other embodiments are not limited thereon. In various embodiments, the first electronic device (100a) may include less or more number of components. Further, the labels or names of the components are used only for illustrative purpose and does not limit the scope of the disclosure. One or more components can be combined together to perform same or substantially similar function in the first electronic device (100).

Figure 6:
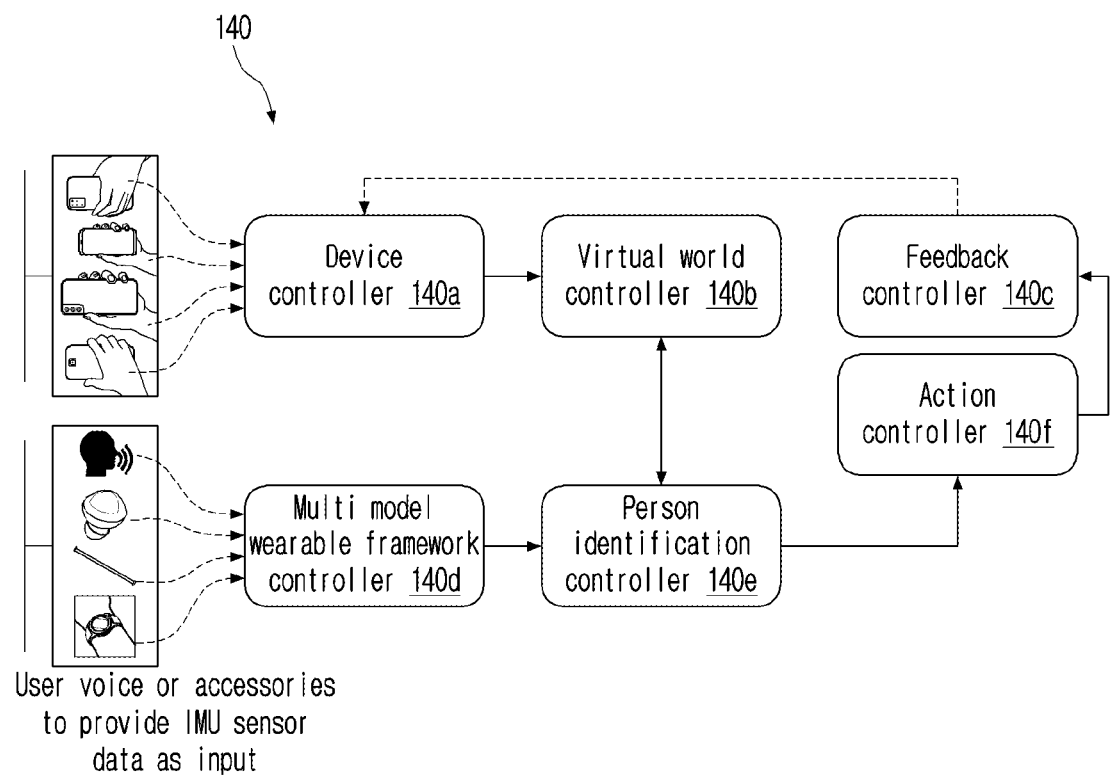
FIG. 6 is a diagram illustrating an example configuration of a user identity controller included in the electronic device, according to various embodiments.

FIG. 6 is a diagram illustrating an example configuration of the user identity controller (140) included in the first electronic device (100a), according to various embodiments. In an embodiment, the user identity controller (140) includes a device controller (140a), a virtual world controller (140b), a feedback controller (140c), a framework controller (140d), a person identification controller (140e), and an action controller (140f), each of which may include various processing/control circuitry and/or executable program instructions.

The device controller (140a) is responsible for interaction with all external devices (e.g., second electronic device and wearable devices). Further, the device controller (140a) is responsible for starting a collaborative voice interaction session to invite the required participants around the user. Further, the device controller (140a) shows the list of available devices around the user and the user can chose to invite specific participant devices in the collaborative voice interaction session. Further, the device controller (140a) obtains the various connection related metadata information and passes on to the virtual world controller (140b) to process the participating device's location with respect to the primary electronic device. The device controller (140a) maintains a unique device identifier (ID) for each connected participating device. The device controller (140a) plays the its role of dispatching the response received from the feedback processor to the target participant device based on the device ID, and the response is executed on the second electronic device.

The virtual world controller (140b) connects to devices using a communicator (120) (e.g., Bluetooth or the like). User's electronic device which initiated the bridge acts as Bluetooth receiver. Other participants' devices, joining collaborative voice interaction session, act as transmitters. The virtual world controller (140b) generates the virtual map and places the user of the primary device at an anchor position in the map. The virtual world controller (140b) uses AoA to determine the direction and RSSI for distance of the participating accessory from it. Other participants, who join the session, are localized with respect to the user in the virtual map. These initial positioning of the participating user through bridge is used to improve the localization accuracy.

The framework controller (140d) receives the inputs from the user. The inputs include the voice inputs as part of the conversation user is having, and the IMU sensors data generated by various accessories as part of natural gestures and interactions during conversation. Though it accepts all the voice inputs but identifies the meaningful conversations which can result in either updating the virtual map or taking an appropriate action.

The person identification controller (140e) updates the virtual map and tags the participant based on the IMU sensor data received from the smart watch as part of pointing gesture and the person name detected in the conversation. Based on NLU intent (from user command) and IMU sensor data of user's galaxy buds as part of head movement towards the participant, the person identification controller (140e) identifies the missing participants names and fetches it from the tagged Virtual map.

The feedback controller (140c) is responsible to provide an appropriate response to the correct participating device, based on the action performed by the Action Processor of the system. Out of multiple devices participating in the collaborative voice interaction session, feedback controller (140c) detects if the response needs to be sent to one or more of the participating devices as a result of the current conversation. Based on the Device ID received from upstream modules, feedback controller (140c) dispatches the feedback to the device controller (140a) which establishes the connection with the target participant device(s) and dispatches to the action controller (140f).

Although FIG. 6 shows various hardware components of the user identity controller (140) it is to be understood that other embodiments are not limited thereon. In various embodiments, the user identity controller (140) may include less or more number of components. Further, the labels or names of the components are used only for illustrative purpose and does not limit the scope of the disclosure. One or more components can be combined together to perform same or substantially similar function in the user identity controller (140).

Figure 7:
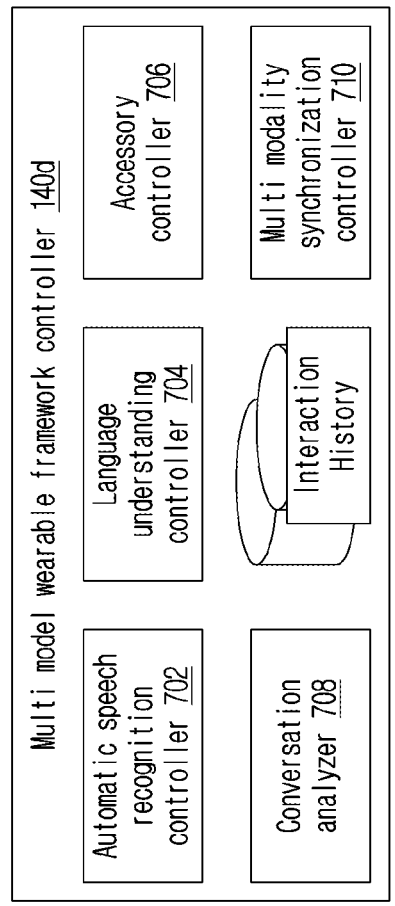
FIG. 7 is a block diagram illustrating an example configuration of a multi modal wearable framework controller included in the user identify controller, according to various embodiments.

FIG. 7 is a block diagram illustrating an example configuration of the multi modal wearable framework controller (140d) included in the user identity controller (140), according to various embodiments. In an embodiment, the multi modal wearable framework controller (140d) includes an automatic speech recognition controller (702), a language understanding controller (704), an accessory controller (706), a conversation analyser (708) and a multi-modality synchronization controller (710), each of which may include various processing/control circuitry and/or executable program instructions. The automatic speech recognition controller (702) converts the user speech data to text format. The language understanding controller (704) processes the text generated by ASR module and generates user intent and other language attributes. The accessory controller (706) handles the user accessories sensor data. The conversation analyser (708) Identifies meaningful conversations which should result in some action or if virtual map to be updated or to ignore. The meaningful conversations are identified from the processed text received from the language understanding controller (704). The multi-modality synchronization controller (710) performs the temporal synchronisation of various conversation and IMU sensor data. It is important to keep conversation and sensor data in sync based on the respective timestamps to find a correlation. The interaction history keeps track of user interactions Although FIG. 7 shows various hardware components of the multi modal wearable framework controller (140d) it is to be understood that other embodiments are not limited thereon. In various embodiments, the multi modal wearable framework controller (140d) may include less or more number of components. Further, the labels or names of the components are used only for illustrative purpose and does not limit the scope of the disclosure. One or more components can be combined together to perform same or substantially similar function in the multi modal wearable framework controller (140d).

Figure 8:
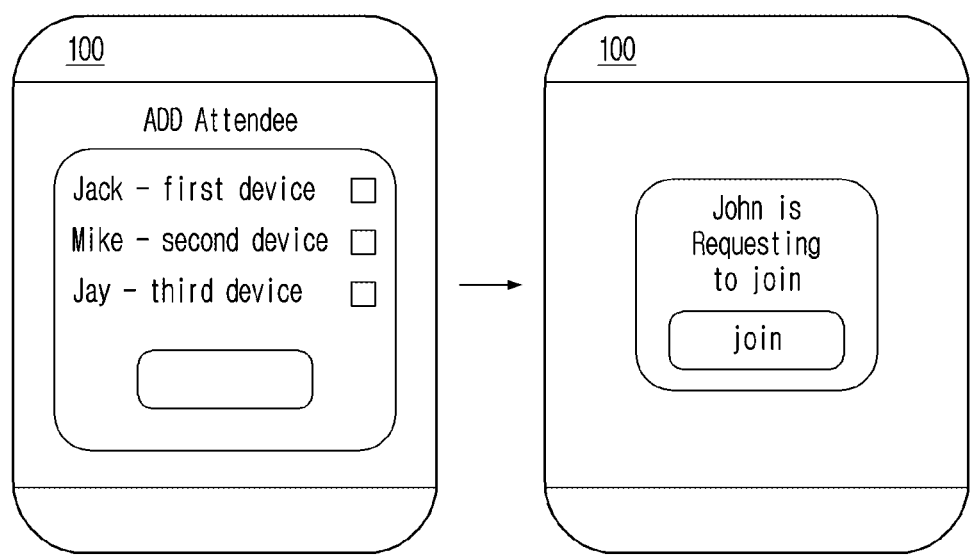
FIG. 8 is a diagram illustrating example operations of a device controller included in the user identity controller are explained, according to various embodiments.

FIG. 8 is a diagram illustrating an example in which operations of the device controller (140) included in the user identity controller (140) are explained, according to various embodiments.

The device controller (140a) is responsible for interaction with all external devices (e.g., second electronic device and wearable devices). Further, the device controller (140a) is responsible for starting a collaborative voice interaction session to invite the required participants around the user. Further, the device controller (140a) shows the list of available devices around the user and the user can chose to invite specific participant devices in the collaborative voice interaction session. Further, the device controller (140a) obtains the various connection related metadata information and passes on to the virtual world controller (140b) to process the participating device's location with respect to the primary electronic device. The device controller (140a) maintains the unique ID for each connected participating device. The device controller (140a) plays the its role of dispatching the response received from the feedback processor to the target participant device based on the device ID, and the response is executed on the second electronic device (100b).

Figure 9:
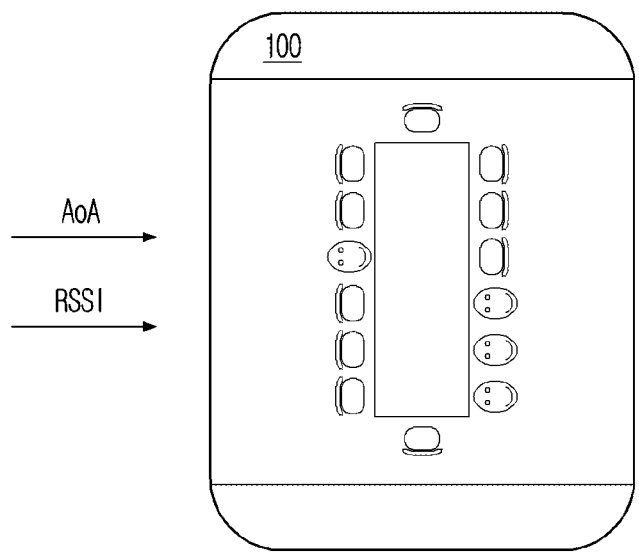
FIG. 9 is diagram illustrating example operations of a virtual world controller included in the user identity controller are explained, according to various embodiments.

FIG. 9 is a diagram illustrating an example in which operations of the virtual world controller (140b) included in the user identity controller (140) are explained, according to various embodiments.

As shown in FIG. 9, the virtual world controller (140b) connects to devices using the communicator (120) (e.g., Bluetooth or the like). User's electronic device which initiated the bridge acts as the Bluetooth receiver. Other participants' devices, joining collaborative voice interaction session, act as transmitters. The virtual world controller (140b) generates the virtual map and places the user of the primary device at an anchor position in the map. The virtual world controller (140b) uses AoA to determine the direction and RSSI for distance of the participating accessory from it. Other participants, who join the session, are localized with respect to the user in the virtual map. These initial positioning of the participating user through bridge is used to improve the localization accuracy.

Figure 10:
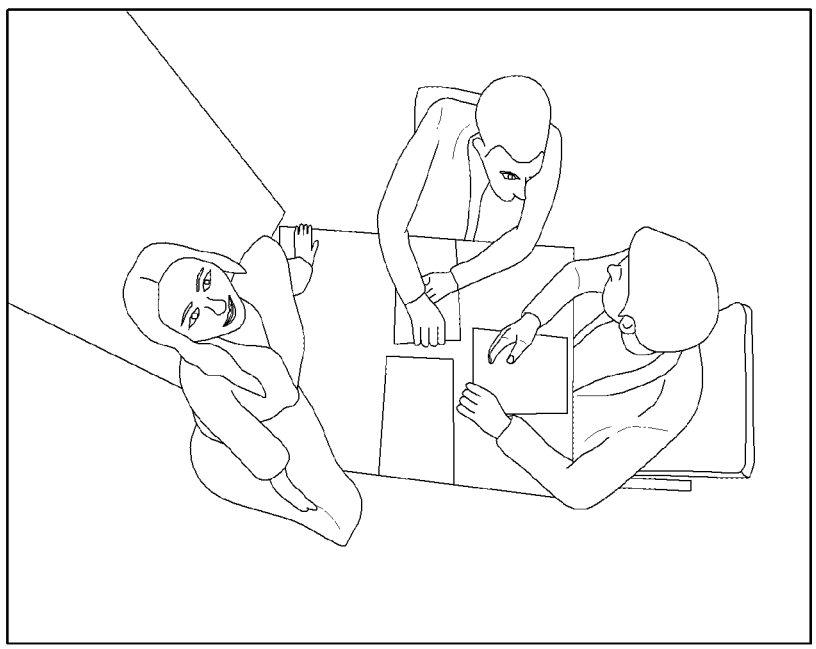
FIG. 10 and FIG. 11 diagrams illustrating an example in which operations of an accessory controller in the multi modal wearable framework controller are explained, according to various embodiments.
Figure 11:
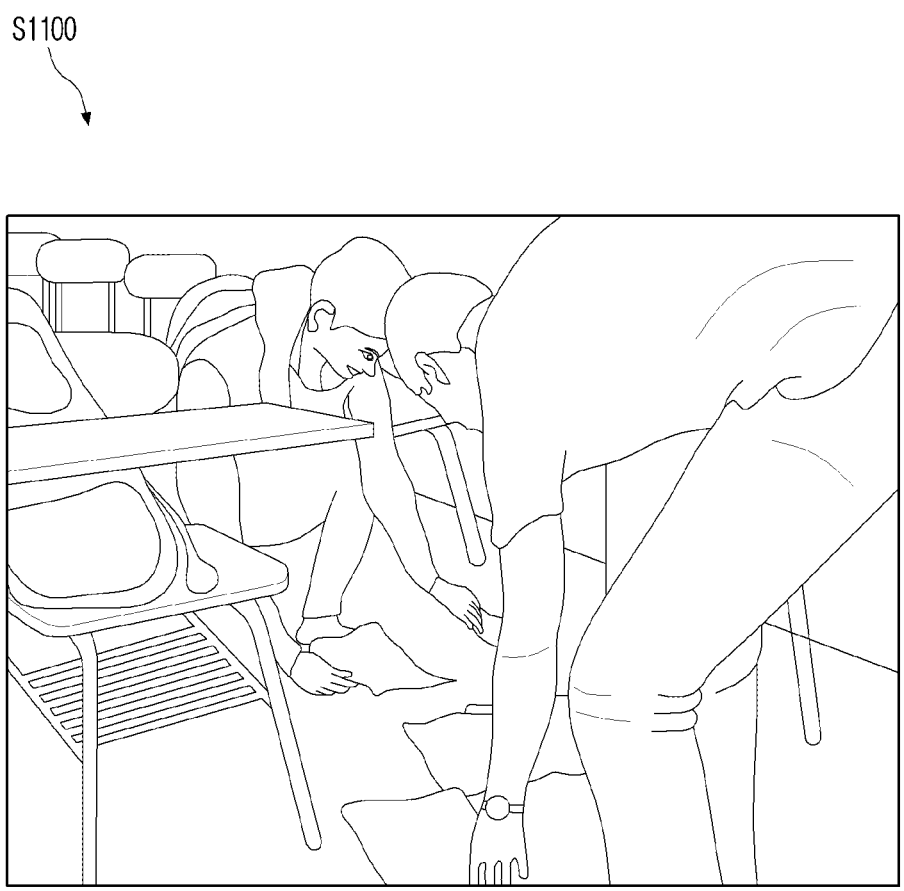

FIG. 10 and FIG. 11 are diagrams illustrating examples in which operations of the accessory controller (706) in the multi modal wearable framework controller (140d) are explained, according to various embodiments.

The accessory controller (706) obtains the rotation matrix and orientation matrix (e.g., azimuth, pitch, Roll) from an accelerometer and a magnetometer. The accessory controller (706) applies a low-pass filtering of the noisy accelerometer/magnetometer signal to get orientation angles averaged over time within a constant time window. Further, the accessory controller (706) converts Azimuth from radian to degrees, round up to two decimal places and gets the angle. Further, the accessory controller (706) obtains the gyroscope based orientation from the rotation matrix: (e.g., getOrientation (gyroMatrix, gyroOrientation). Further, the accessory controller (706) determines the direction of movement (e.g., if (angle>=350||angle<=10) then direction="UP"). Further, the accessory controller (706) determines the distance travelled by Integrating the acceleration value with the time window twice The accessory controller (706) is responsible for analyzing the accessories sensor data to make sure it's valid for the disclosed method using a predefined threshold values. In an example, a table 1 shows threshold values for each accessory to classify an accessory movement as conversational (valid) vs Non-conversational (Outlier). Beyond this range it's classified as "Non-conversational"

TABLE 1

| Accessory Direction Threshold for Non-Conversation movements | | Distance (mm) | | Rotation(degree) | |
|---|---|---|---|---|---|
| | | Min | Max | Min | Max |
| Ear Buds | UP | 5 | 15 | 2 | 160 |
| Smart Watch | DOWN | 10 | 50 | 5 | 110 |
| Smart Watch | RIGHT | 5 | 220 | 10 | 170 |

As shown in FIG. 10, the woman looking up (S1000). The sensor data are (e.g., accessory: Buds, Dir: "Up", Distance: 20 mm, Rotation: 65 degree). Based on the disclosed method, the data is classified as the non-conversational. Similarly, as shown in FIG. 11, the Man picking up dropped papers (S1100). The sensor data are (e.g., Sensor Data: Accessory: Smart Watch, Dir: "Down", Distance: 65 mm, Rotation: 65 degree). Based on the disclosed method, the data is classified as classified as non-conversational.

Figure 12A:
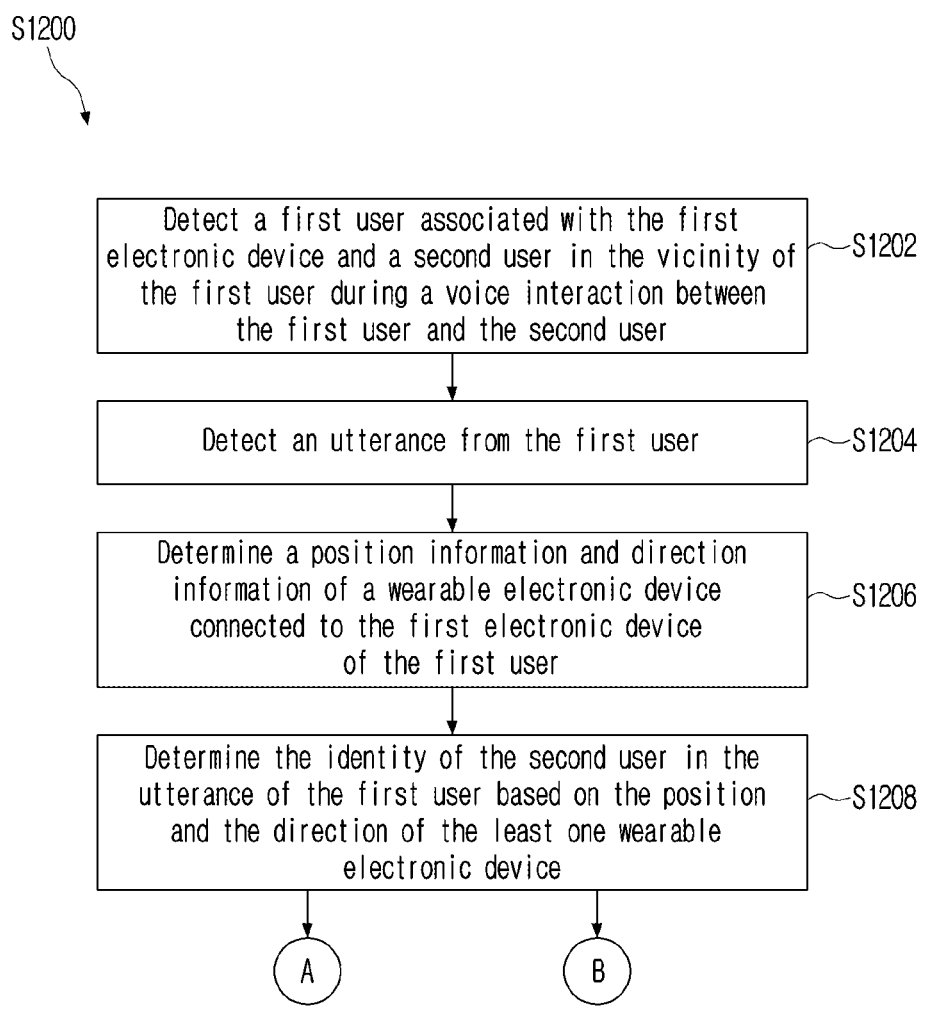
FIGS. 12A, 12B and 12C are flowcharts illustrating an example method for the enhanced interaction with the voice assistant using the user accessories data, according to various embodiments.
Figure 12B:
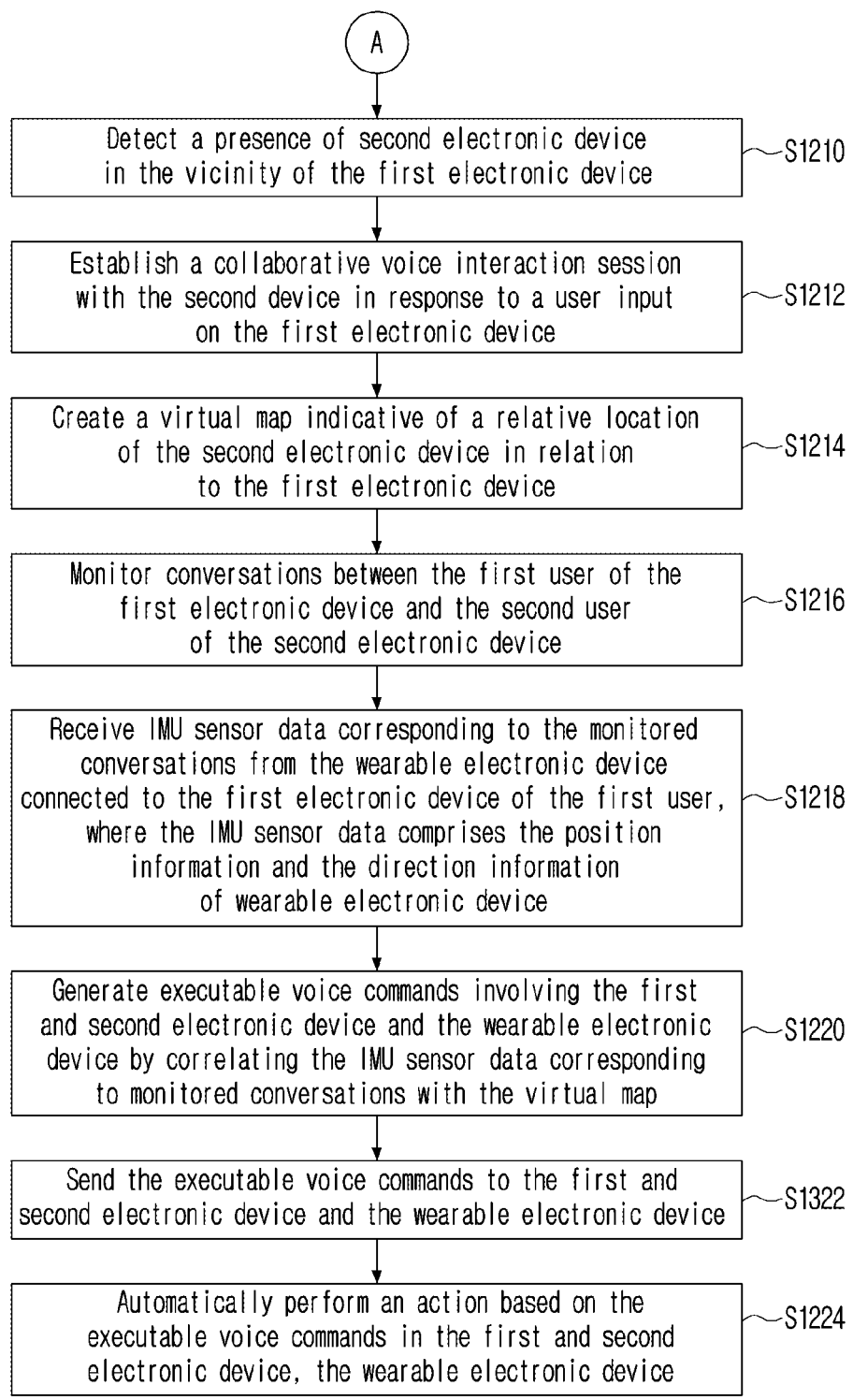
Figure 12C:
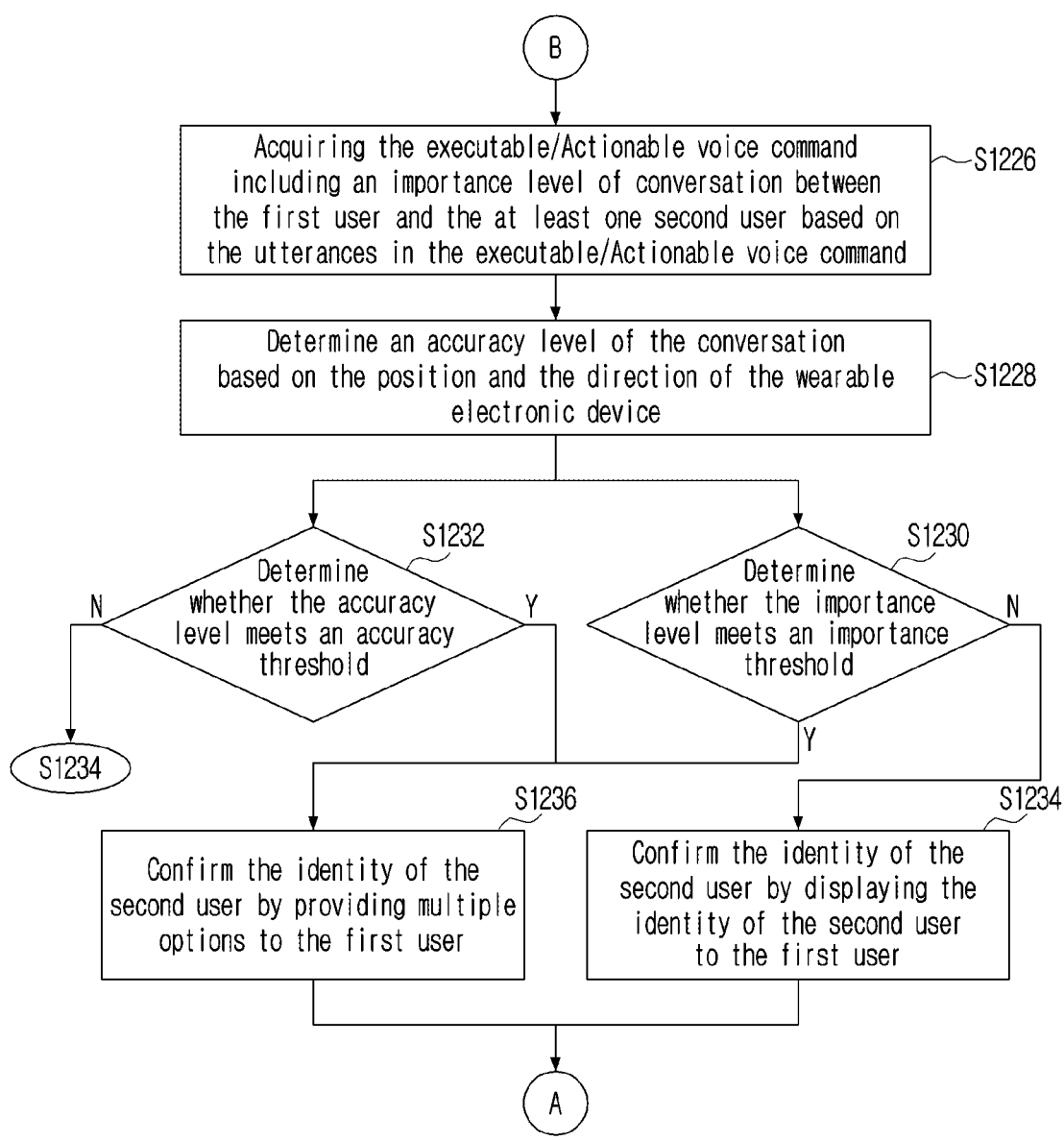

FIGS. 12A, 12B and FIG. 12C are flowcharts (S1200) illustrating a method for the enhanced interaction with the voice assistant using the user accessories data, according to an embodiment as disclosed herein. The operations (S1202-S1232) may be performed by the user identity controller (140).

At S1202, the method includes detecting the first user associated with the first electronic device (100a) and the second user in the vicinity of the first user during the voice interaction between the first user and the second user. At S1204, the method includes detecting the utterance from the first user. At S1206, the method includes determining the position information and the direction information of the wearable electronic device (200) connected to the first electronic device (100a) of the first user. At S1208, the method includes determining the identity of the second user indicated in the utterance of the first user based on the position and the direction of the at least one wearable electronic device (200).

At S1210, the method includes detecting the presence of the second electronic device (100b) in the vicinity of the first electronic device (100a). At S1212, the method includes establishing the collaborative voice interaction session with the second device in response to the user input on the first electronic device (100a). At S1214, the method includes creating the virtual map indicative of the relative location of the second electronic device (100b) in relation to the first electronic device (100a).

At S1216, the method includes monitoring conversations between the first user of the first electronic device (100a) and the second user of the second electronic device (100b). At S1218, the method includes receiving the IMU sensor data corresponding to the monitored conversations from the wearable electronic device (200) connected to the first electronic device (100a) of the first user.

At S1220, the method includes generating the executable voice commands involving the first and second electronic device (100a and 100b) and the wearable electronic device (200) by correlating the IMU sensor data corresponding to monitored conversations with the virtual map. At S1222, the method includes sending the executable voice commands to the first and second electronic device (100a and 100b) and the wearable electronic device (200). At S1224, the method includes automatically performing the action based on the executable voice commands in the first and second electronic devices (100 and 100b) and the wearable electronic device (200).

At S1226, the method includes acquiring the executable/actionable voice command including the importance level of conversation between the first user and the one or more second user based on the utterances. In an example, as the conversation may be long, and there could be multiple actionable commands of different level of importance during it.

At S1228, the method includes determining the accuracy level of the conversation based on the position and the direction of the wearable electronic device (200). At S1230, the method includes determining whether the importance level meets the importance threshold. At S1232, the method includes determining whether and the accuracy level meets the accuracy threshold.

If the importance level meets the importance threshold and/or the accuracy level meets the accuracy threshold, at S1236, the method includes confirming the identity of the second user by providing multiple options to the first user. If the importance level does not meet the importance threshold and/or the accuracy level does not meet the accuracy threshold then, at S1234, the method includes confirming the identity of the second user by displaying the identity of the second user to the first user.

The disclosed method can be used to create the collaborative voice interaction session and generate the virtual map indicative of relative locations of the one or more second electronic device (100b) in relation to the first electronic device (100a). The method can be used to dynamically update the virtual map by correlating IMU sensor data received from one or more wearable device (200) connected with the first electronic device (100a) and corresponding to monitored conversations, so as to enhance the user experience.

The method can be used to dynamically update the virtual map by intelligently infer from only user's accessories' IMU sensor data and the user conversation. The method can be used to execute one or more voice command involving the first electronic device and at least one second electronic device by correlating the IMU sensor data received from one or more wearable devices (200) of the user, associated with the first electronic device (100a), corresponding to monitored conversations with other users with respect to the virtual map. The method can be used to provide an enhanced interaction with a voice assistant by creating the collaborative voice interaction session with one or more nearby electronic devices (100a and 100b) and monitoring conversations between the users. The method can be used to enhance the interaction with voice assistants using the sensor data from the user accessories in correlation to the monitored conversations between multiple users.

The various actions, acts, blocks, steps, or the like in the flow diagram (S1200) may be performed in the order presented, in a different order or simultaneously. Further, in various embodiments, some of the actions, acts, blocks, steps, or the like may be omitted, added, modified, skipped, or the like without departing from the scope of the disclosure.

Figure 13:
FIG. 13 is a diagram illustrating an example in which a user is wearing smart glasses but the smart glasses are not connected with an electronic device, according to the prior art.
Figure 14:
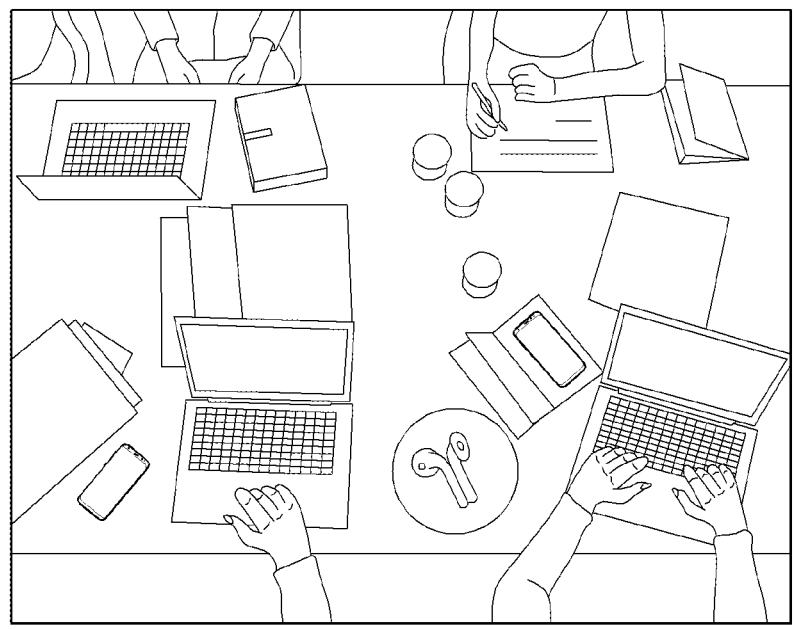
FIG. 14 is a diagram illustrating an example in which the user has buds connected to the electronic device, but the buds is not worn by the user, according to the prior art.

FIG. 13 is a diagram illustrating an example (S1300) in which the user has smart buds connected to the electronic device (100), but the smart buds is not worn by the user, according to the prior art. If the user has the smart buds connected to her/her device, but the user is not wearing them, then, the method does not work. Similarly, as shown in FIG. 14, the user has smart buds connected to the electronic device, but the smart buds are not worn by the user.

Figure 15:
FIG. 15 is a diagram illustrating an example in which the user is wearing the smart glasses and the smart watch, and the smart glasses and smart watch are connected together, according to various embodiments.

FIG. 15 is a diagram illustrating an example (S1500) in which the user is wearing the smart glasses and the smart watch, and the smart glasses and smart watch are connected together, according to various embodiments. If the user is wearing smart glasses and the smart watch, both are connected, the disclosed method will operate.

FIG. 16 is diagram illustrating an example (S1600) in which an auto user profiling is explained, according to various embodiments. As shown FIG. 16, the user of the electronic device (100a) is wearing both smart watch and ear buds. The user of the electronic device (100a) uses hand gesture more than head orientation or gaze during a conversation. Based on the disclosed method, the predefined weight is assigned to the accessories user is wearing. Over a period of time the electronic device (100a) adjusts these weights by learning user behaviour or by correcting error some user prediction. Example if he uses hand gesture too often, the watch weight is reduced, or if the user was too often looking at a place where possibly a display device was present, then buds weights can be reduced to minimize and/or reduce the wrong indication.

In an example, based on a default device weight for the watch is 50% and the bud is 50%. The electronic device (100a) analyses the user interaction pattern in various modality. Hence, the unique user device weight for the watch is 30% and the bud is 70%.

FIG. 17 is a diagram illustrating an example (S1700) in which the system (400) provides the enhanced interaction with the voice assistant using the user accessories data is depicted when the user of the electronic device (100a) makes the payment in a restaurant, according to various embodiments.

At S1702, the group of friends have having lunch together and the user "A" of the electronic device (100a) initiates the collaboration session and sends an invite to participants in proximity. At S1704, the participants (e.g., user B, user C and user D) receive the invitation in their respective electronic devices. All participants accept and join the collaboration session.

At S1706, based on the disclosed method, the virtual map is created in the electronic device (100) with available participants. Using the AoA and RSSI from the participant devices, their initial location is identified with respect to the virtual map.

At S1708 and 1710, the user "A" of the electronic device (100a) settles the bill and others agree to pay him their share. The user B pays John $100 and the user A wearing the smart watch, accepts and says "Thanks user B, let me pay you back the change". The user A of the electronic device (100) commands the virtual assistance "Pay her 28 dollars and 40 cents". Based on the disclosed method, the virtual assistance knows who to pay, and payment is succeeded once the user A confirms on Payment screen. The bill is settled between the user A and the user B, effortlessly.

Figure 18:
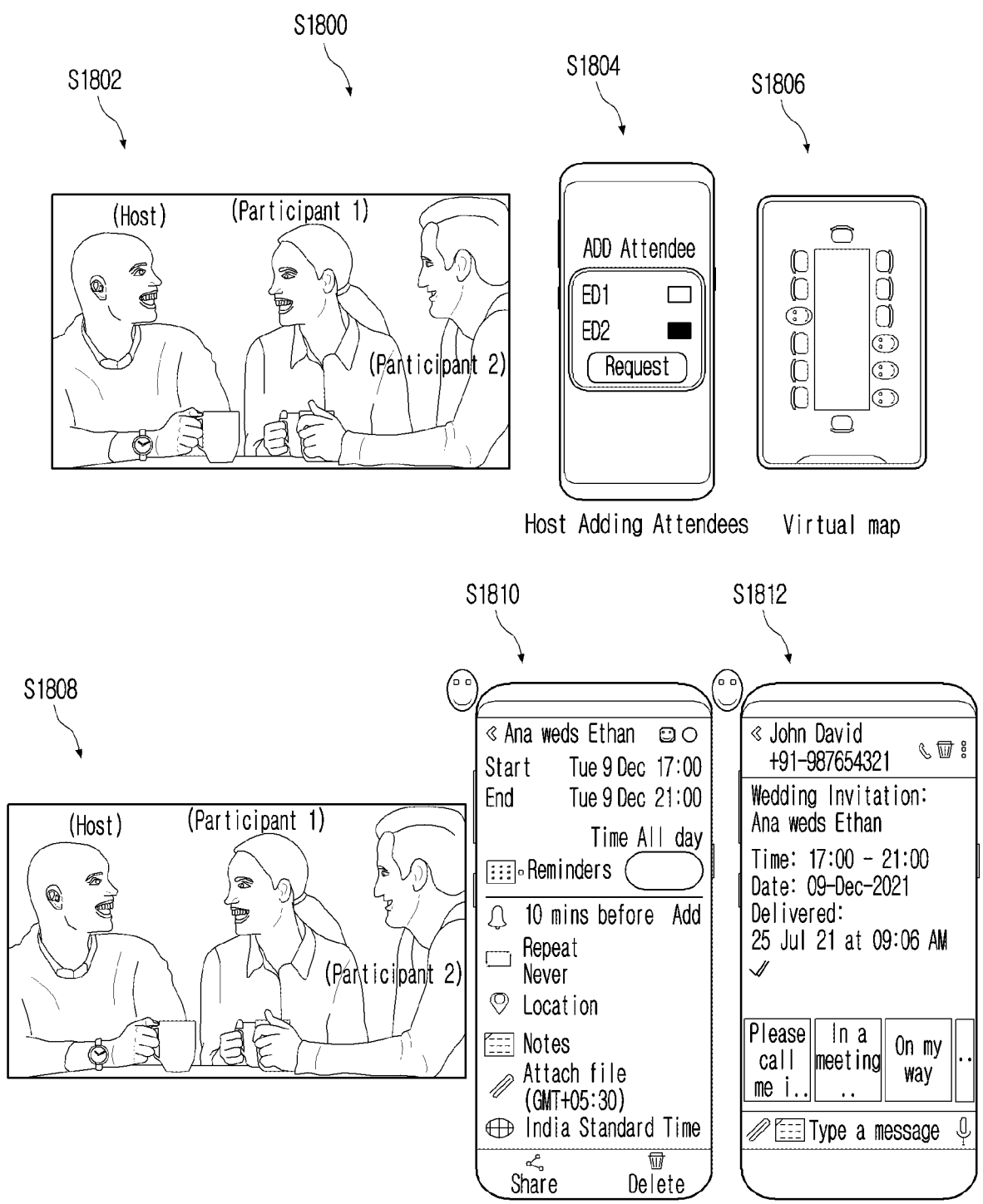
FIG. 18 is diagram illustrating an example in which the system provides the enhanced interaction with the voice assistant using the user accessories data when three friends casually meet at a coffee shop, according to various embodiments.

FIG. 18 is a diagram illustrating an example (S1800) in which the system (400) provides the enhanced interaction with the voice assistant using the user accessories data when three friends casually meet at a coffee shop, according to various embodiments.

At S1802, consider the scenario three friends (user A, user B and user C) casually meet at a coffee shop. At S1804, the user A of the electronic device (100) initiates a collaboration session and sends Invite by selecting detected participant in proximity. The participant receives invitation in their respective electronic device. The participant accepts and joins the session. At S1806, the virtual map is created in the electronic device, by the user A, with available participants. Using the AoA and RSSI from the participant devices, their initial location is identified with respect to the virtual map. At S1808 and 1810, the user B looks at the user A and says "Hey user A, the user B and the user C getting married. The user A replies "Wow! Congrats both of you! When?". Further, the user B replies "This December 9th". The system immediately creates calendar event for the user A and the user B. The user A is wearing the smart buds, now turns towards the user B (e.g., Participant 1) "Please share me Invite and the user B replies "Sure". The system immediately forward their wedding invite to John.

Figure 19:
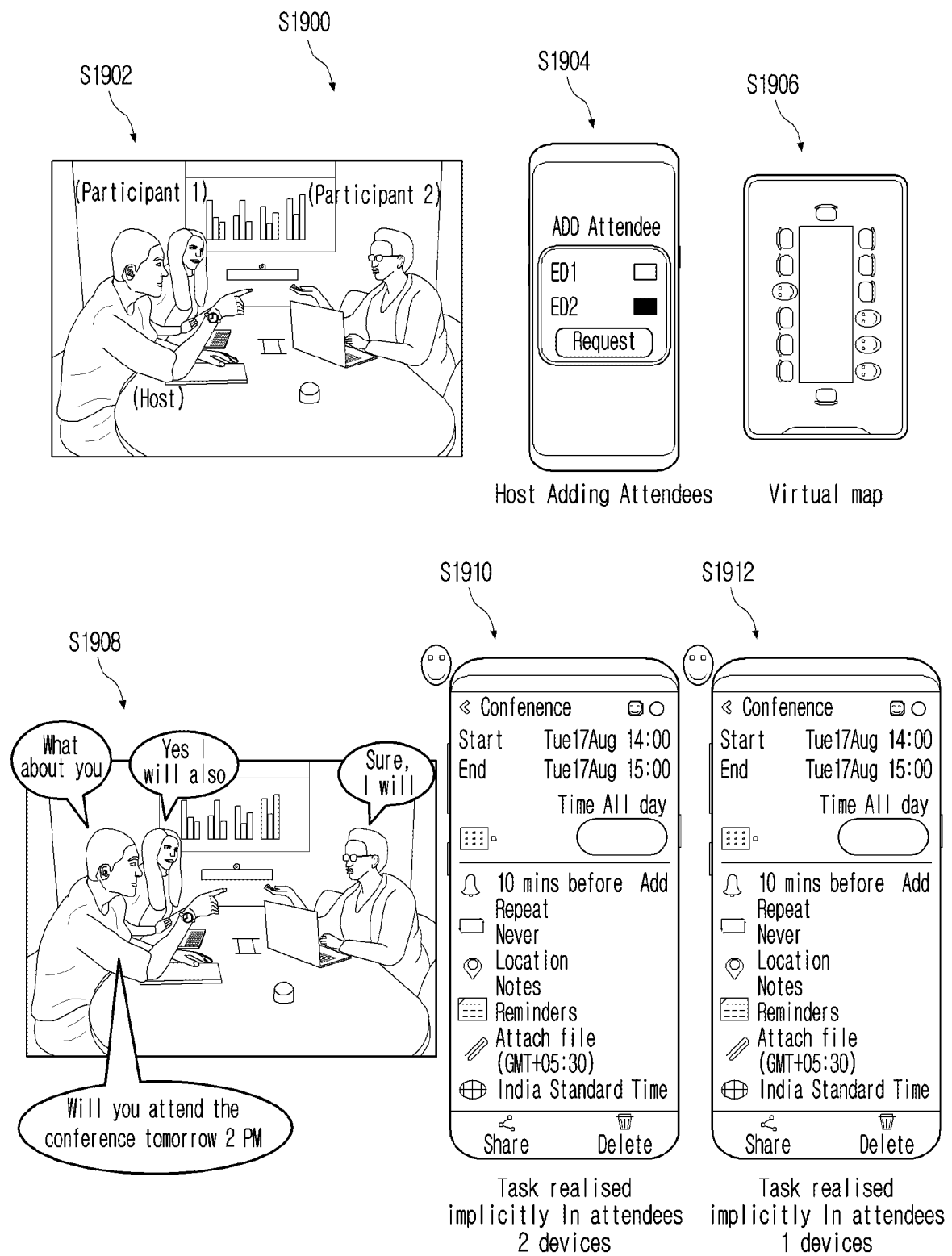
FIG. 19 is diagram illustrating an example in which the system provides the enhanced interaction with the voice assistant using the user accessories data when the three colleagues disusing about an upcoming conference, according to various embodiments.

FIG. 19 is a diagram illustrating an example (S1900) in which the system (400) provides the enhanced interaction with the voice assistant using the user accessories data when the three colleagues disusing about an upcoming conference, according to various embodiments;

At S1902, consider the scenario, three colleagues (user A, user B and user C) disusing about an upcoming conference. At S1904, the user A of the electronic device (100) initiates a collaboration session and sends Invite by selecting detected participants (e.g., user B and user C) in proximity. The participant receives invitation in their respective electronic device. The participant accepts and joins the session. At S1906, the virtual map is created in the electronic device, by the user A, with available participants. Using the AoA and RSSI from the participant devices, their initial location is identified with respect to the virtual map. At S1908 and S1910, The user A points his S-pen and asks the user B (participant 2) "Will you attend the conference tomorrow. The user B replies "Sure I will". The system immediately creates calendar event for the user B. The user A is wearing the smart buds, now turns towards the user B and asks "What about you?". The user B replies as "Yes I will also". The system immediately creates a same reminder for the user B as well.

Figure 20A:
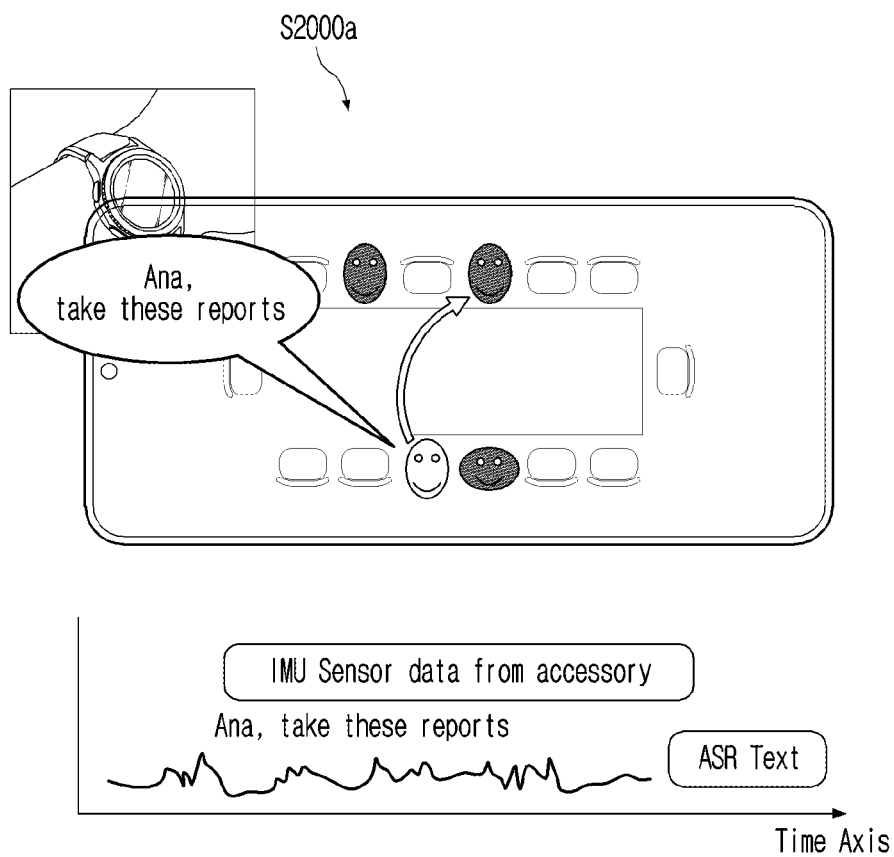
FIGS. 20A and 20B are diagrams illustrating an example in which operations of a person identification controller is explained, according to various embodiments.
Figure 20B:
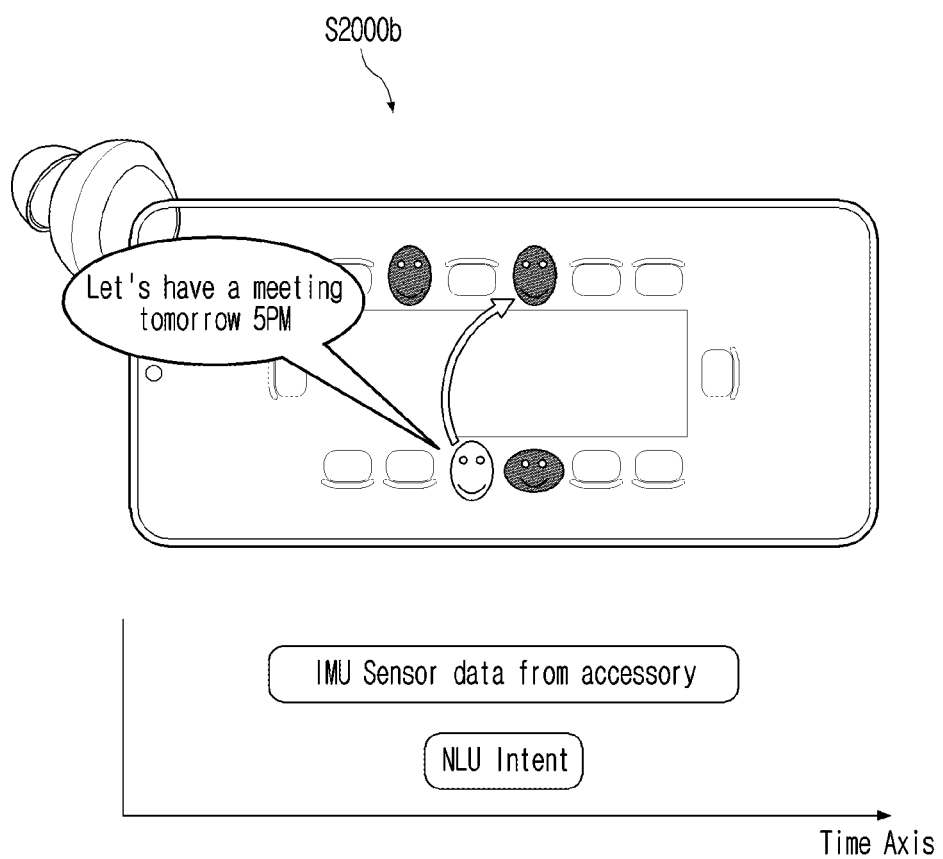

FIGS. 20A and 20B are diagrams illustrating examples (S2000a and S2000b) in which operations of a person identification controller is explained, according to various embodiments.

As shown in FIG. 20A, during the conversation when the utterance comprises the data item indicative of an identity like "Ana" in correlation of the IMU sensor data the of the at least one wearable electronic device used during that utterance like due to movement of the hand with smart watch or movement of the ear buds during turning the first user's heads towards the second user. Based this information, the method can be used to update the virtual map and mark the second user relative to the first user in the virtual map.

As shown in FIG. 20B, once the second user is marked in the virtual map, thereafter any utterance which involves some action to be performed and involves second user but does not contain the identity of the second user, the method can be used to resolve the identity of the second user as "Ana" automatically.

FIG. 21 and FIG. 22 are diagrams illustrating examples (S2100 and S2200) in which the first electronic device (100a) identities the second user associated with one or more second electronic device (100b) and determines the importance and accuracy levels, according to various embodiments.

As shown in FIG. 21, the user of the electronic device (100a) says "Let me send you 50 $". Since the UCP found the action is high importance and high accuracy. The electronic device (100) chooses to confirm user with name. The high importance can be, for example, but not limited to payments, booking ticket or the like. The low importance can be, for example, but not limited to meeting invite, file sharing, reminder or the like The user of the electronic device (100a) says "Let me send you 50 $". Since UCP found the action is high importance and low accuracy. The electronic device (100a) chooses to confirm the user with name by giving option.

As shown in FIG. 22, the user of the electronic device (100a) says "I will send invite to you all". Since the UCP found the action is low importance and high accuracy. The electronic device (100) chooses to take action without user confirmation (e.g., confirm it with user, no user confirmation, confirm with options or the like).

The user of the electronic device (100a) says "I will send invite to you all" Since the UCP found the action is high importance and low accuracy. The electronic device (100) chooses to confirm the user with name by giving option.

Figure 23A:
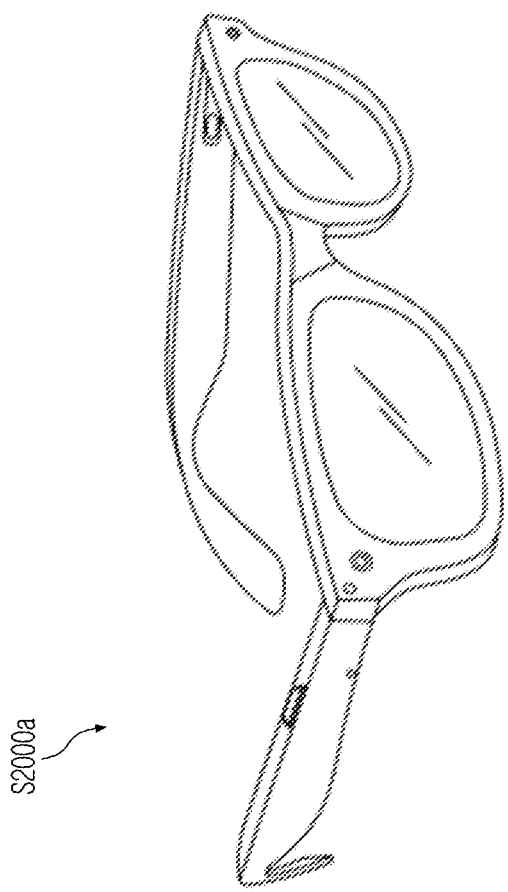
FIGS. 23A, 23B and 23C are diagrams illustrating examples in which usage of a non-camera based smart wearable device is depicted, according to various embodiments.
Figure 23B:
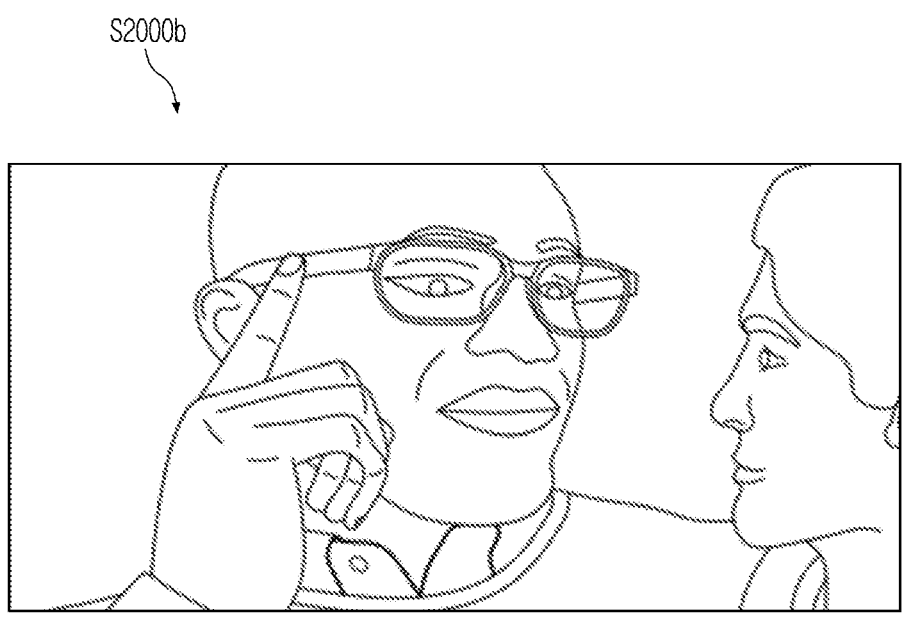
Figure 23C:
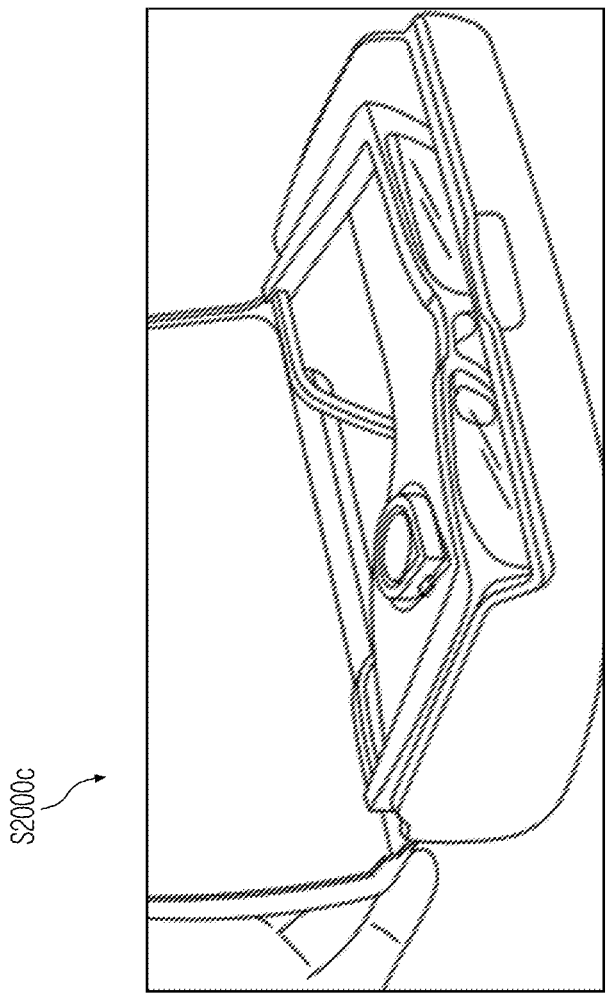

FIGS. 23A, 23B and 23C are diagrams illustrating examples (S2300a, S2300b and S2300c) in which usage of a non-camera based smart wearable device is depicted, according to various embodiments. The disclosed method can equally extend to any other non-camera based smart wearable devices like smart glasses. The user wear the smart glasses all the time and also during regular conversations.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method comprising:
detecting, by a first electronic device, a first user using the first electronic device and at least one second user, during a voice interaction between the first user and the at least one second user;
detecting, by the first electronic device, an utterance from the first user, wherein the utterance comprises a data item indicative of an identity of the at least one second user;
after detecting the utterance from the first user, determining, by the first electronic device, at least one of position or direction of at least one wearable electronic device worn by the first user and connected to the first electronic device of the first user;
determining, by the first electronic device, the at least one second user indicated in the utterance of the first user based on the at least one of the position or the direction of the at least one wearable electronic device connected to the first electronic device;
receiving, by the first electronic device, signals from one or more second electronic devices each associated with a corresponding one of the at least one second user;
generating, by the first electronic device, a virtual map of respective positions of the one or more second electronic devices relative to the first electronic device based on the received signals, wherein the first user is positioned at a reference position in the virtual map;
correlating, by the first electronic device, sensor data from the at least one wearable electronic device corresponding to conversation among the first user and the at least one second user with the virtual map;
generating, by the first electronic device, executable voice commands for respective execution by one or more of the first electronic device, the at least one wearable electronic device, or the one or more second electronic devices based on the correlating and an importance level and an accuracy level of the conversation;
sending, by the first electronic device, one or more of the executable voice commands to the wearable electronic device or the one or more second electronic devices; and
automatically performing, by the first electronic device, at least one action based on one or more of the executable voice commands for execution by the first electronic device.

2. The method as claimed in claim 1, further comprising:
establishing, by the first electronic device, a collaborative voice interaction session with the one or more second electronic devices in response to an input to the first electronic device;
monitoring, by the first electronic device, conversation between the first user and the at least one second user; and
receiving, by the first electronic device, inertial measurement unit (IMU) sensor data corresponding to the monitored conversation from the at least one wearable electronic device, wherein the IMU sensor data is used to determine the at least one of the position or the direction of the at least one wearable electronic device,
wherein the correlating comprises correlating the received IMU sensor data with the virtual map.

3. The method as claimed in claim 2, further comprising determining, by the first electronic device, an Angle of Arrival (AoA) and a Received Signal Strength Indication (RSSI) based on the received signals from the one or more second electronic devices.

4. The method as claimed in claim 2, further comprising:
determining, by the first electronic device, the importance level of the conversation;
determining, by the first electronic device, the accuracy level of the conversation based on the at least one of the position or the direction of the at least one wearable electronic device;
determining, by the first electronic device, whether the importance level satisfies an importance threshold and the accuracy level satisfies an accuracy threshold; and
performing, by the first electronic device, at least one of:
confirming the identity of the at least one second user by displaying the identity of the at least one second user to the first user in response to determining that at least one of the importance threshold or the accuracy threshold is satisfied, or
confirming the identity of the at least one second user by providing multiple options to the first user in response to determining that at least one of the importance threshold or the accuracy threshold is not satisfied.

5. The method as claimed in claim 1, wherein the determining, by the first electronic device, of the at least one of position information or direction information of the at least one wearable electronic device comprises:

determining, by the first electronic device, a weight for each of the at least one wearable electronic device from a plurality of wearable electronic devices connected to the first electronic device of the first user by applying a machine learning model; and determining, by the first electronic device, the at least one of position information or direction information of the at least one wearable electronic device based the weight of each of the at least one wearable electronic device.

6. A first electronic device comprising:
memory;
at least one processor, comprising processing circuitry, configured to:
    detect a first user using the first electronic device and at least one second user, during a voice interaction between the first user and the at least one second user;
    detect an utterance from the first user, wherein the utterance comprises a data item indicative of an identity of the at least one second user;
    after detecting the utterance from the first user, determine at least one of position or direction of at least one wearable electronic device worn by the first user and connected to the first electronic device of the first user;
    determine the at least one second user indicated in the utterance of the first user based on the at least one of the position and or direction of the at least one wearable electronic device connected to the first electronic device;
    receive signals from one or more second electronic devices each associated with a corresponding one of the at least one second user;
    generate a virtual map of respective positions of the second electronic devices relative to the first electronic device based on the received signals, wherein the first user is positioned at a reference position in the virtual map;
    correlate sensor data from the at least one wearable electronic device corresponding to conversation among the first user and the at least one second user with the virtual map;
    generate executable voice commands for respective execution by one or more of the first electronic device, the at least one wearable electronic device, or the second electronic device based on the correlating and an importance level and an accuracy level of the conversation;
    send one or more of the executable voice commands to the wearable electronic device or the one or more second electronic devices; and
    automatically perform at least one action based on one or more of the executable voice commands for execution by the first electronic device.

7. The first electronic device as claimed in claim 6, wherein the at least one processor is configured to:
    establish a collaborative voice interaction session with the one or more second electronic devices in response to a user input to the first electronic device;
    monitor conversation between the first user and the at least one second user; and
    receive inertial measurement unit (IMU) sensor data corresponding to the monitored conversation from the at least one wearable electronic device, wherein the IMU sensor data is used to determine the at least one of the position or the direction of the at least one wearable electronic device, wherein the correlating comprises correlating the received IMU sensor data with the virtual map.

8. The first electronic device as claimed in claim 7, wherein the at least one processor is configured to:
    determine an Angle of Arrival (AoA) and a Received Signal Strength Indication (RSSI) based on the received signals from the one or more second electronic devices.

9. The first electronic device as claimed in claim 7, wherein the at least one processor is configured to:
    determine the importance level of the conversation;
    determine the accuracy level of the conversation based on the at least one of the position or the direction of the at least one wearable electronic device;
    determine whether the importance level satisfies an importance threshold and the accuracy level satisfies an accuracy threshold; and
    perform at least one of:
        confirm the identity of the at least one second user by displaying the identity of the at least one second user to the first user in response to determining that at least one of the importance threshold or the accuracy threshold is satisfied, or
        confirm the identity of the at least one second user by providing multiple options to the first user in response to determining that at least one of the importance threshold or the accuracy threshold is not satisfied.

10. The first electronic device as claimed in claim 6, wherein the determining of the at least one of position information or direction information comprises:
    determining a weight for each of the at least one wearable electronic device from a plurality of wearable electronic devices connected to the first electronic device of the first user by applying a machine learning model; and
    determining the at least one of position information or direction information of the at least one wearable electronic device based the weight of each of the at least one wearable electronic device.

11. A non-transitory computer readable storage medium storing instructions which, when executed by at least one processor of a first electronic device, cause the electronic device to perform operations comprising:
    detecting a first user using the first electronic device and at least one second user, during a voice interaction between the first user and the at least one second user;
    detecting an utterance from the first user, wherein the utterance comprises a data item indicative of an identity of the at least one second user;
    after detecting the utterance from the first user, determining at least one of position or direction of at least one wearable electronic device worn by the first user and connected to the first electronic device of the first user;
    determining the at least one second user indicated in the utterance of the first user based on the at least one of the position or the direction of the at least one wearable electronic device connected to the first electronic device;
    receiving signals from one or more second electronic devices each associated with a corresponding one of the at least one second user;
    generating a virtual map of respective positions of the second electronic devices relative to the first electronic device based on the received signals, wherein the first user is positioned at a reference position in the virtual map;

correlating sensor data from the at least one wearable electronic device corresponding to conversation among the first user and the at least one second user with the virtual map;

generating executable voice commands for respective execution by one or more of the first electronic device, the at least one wearable electronic device, or the second electronic device based on the correlating and an importance level and an accuracy level of the conversation;

sending one or more of the executable voice commands to the wearable electronic device or the one or more second electronic devices; and automatically performing one or more of the executable voice commands for execution by the first electronic device.

\* \* \* \* \*